US012736900B2

(12) United States Patent
Takayanagi

(10) Patent No.: US 12,736,900 B2
(45) Date of Patent: Sep. 15, 2026

(54) IMAGE FORMING APPARATUS

(71) Applicant: CANON KABUSHIKI KAISHA, Tokyo (JP)

(72) Inventor: Hiroki Takayanagi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/787,790

(22) Filed: Jul. 29, 2024

(65) Prior Publication Data

US 2025/0044726 A1 Feb. 6, 2025

(30) Foreign Application Priority Data

Aug. 4, 2023 (JP) ................................ 2023-128209

(51) Int. Cl.

*G03G 15/14* (2006.01)
*G03G 15/00* (2006.01)
*G03G 15/01* (2006.01)
*G03G 15/16* (2006.01)
*G03G 21/00* (2006.01)

(52) U.S. Cl.

CPC ..... *G03G 15/1675* (2013.01); *G03G 15/0131* (2013.01); *G03G 15/0189* (2013.01); *G03G 15/1605* (2013.01); *G03G 15/80* (2013.01); *G03G 21/0011* (2013.01)

(58) Field of Classification Search

None

See application file for complete search history.

(56) References Cited

U.S. PATENT DOCUMENTS

2008/0213010 A1* 9/2008 Oyama .............. G03G 15/1675 399/313
2011/0222881 A1* 9/2011 Yamada ............. G03G 15/2032 399/329

(Continued)

FOREIGN PATENT DOCUMENTS

JP 2003057963 A 2/2003
JP 2006284952 A 10/2006

(Continued)

OTHER PUBLICATIONS

Machine translation of Hajime.*

*Primary Examiner* — Sevan A Aydin

(74) *Attorney, Agent, or Firm* — Canon U.S.A., Inc. IP Division

(57) ABSTRACT

An image forming apparatus includes a first photosensitive member and a second photosensitive member that can be charged to a predetermined polarity, an intermediate transfer belt, a first primary transfer member, a second primary transfer member, a first electrode member, a second electrode member, an application sections configured to apply biases having the same polarity as the predetermined polarity to the first and second electrode members, and a control section The first photosensitive member is disposed upstream of the second photosensitive member in a moving direction of the intermediate transfer belt. The control section is configured to control the application sections in such a manner that in image formation, an absolute value of the bias to be applied to the second electrode member is set to be smaller than an absolute value of the bias to be applied to the first electrode member.

3 Claims, 17 Drawing Sheets

(56) References Cited

U.S. PATENT DOCUMENTS

| | | | | |
|---|---|---|---|---|
| 2011/0229201 | A1* | 9/2011 | Yamada | G03G 15/2028<br>399/323 |
| 2017/0227895 | A1* | 8/2017 | Shibuya | G03G 15/1675 |
| 2024/0168414 | A1* | 5/2024 | Kobayashi | G03G 15/162 |
| 2024/0288801 | A1* | 8/2024 | Tanaka | G03G 15/161 |
| 2025/0013175 | A1* | 1/2025 | Takeuchi | G03G 15/0131 |

FOREIGN PATENT DOCUMENTS

| | | | | |
|---|---|---|---|---|
| JP | 2007322515 | A | * | 12/2007 |
| JP | 2008304814 | A | | 12/2008 |
| JP | 2009036927 | A | | 2/2009 |

* cited by examiner

COMPARATIVE EXAMPLE

FIRST EXEMPLARY EMBODIMENT

COMPARATIVE EXAMPLE

SECOND EXEMPLARY EMBODIMENT

CASE WITHOUT POTENTIAL REGULATION MEMBERS

CASE WITH POTENTIAL REGULATION MEMBERS

IMAGE FORMING APPARATUS

BACKGROUND

Field

The present disclosure relates to an image forming apparatus using an electrophotographic method or an electrostatic recording method, such as a copying machine, a printer, a facsimile apparatus, or a multifunction peripheral having a plurality of functions of these apparatuses.

Description of the Related Art

Among image forming apparatuses using an electrophotographic method, such as a color copying machine, a color printer, or a color multifunction peripheral, image forming apparatuses employing an intermediate transfer method are in the mainstream because such image forming apparatuses have an advantage that downsizing of the apparatus is relatively easy and a variety of recording materials can be easily supported. Some of the image forming apparatuses using the intermediate transfer method are tandem image forming apparatuses including a plurality of photosensitive drums (drum-type photosensitive members) and an intermediate transfer belt (an endless belt-like intermediate transfer member). In such an image forming apparatus, toner images formed on a plurality of photosensitive drums are electrostatically and primarily transferred onto an intermediate transfer belt in sequence in primary transfer portions. The toner images primarily transferred onto the intermediate transfer belt are electrostatically and secondarily transferred onto a recording material, such as paper, in a secondary transfer portion. Regarding positions of members near the primary transfer portions, the term “upstream” and the term “downstream” refer to a direction upstream and downstream with respect to the conveyance direction of the intermediate transfer belt, unless otherwise stated. For convenience of explanation, the relative magnitude (the relative height) of a voltage or a potential refers to the relative magnitude (the relative height) in a case where the voltage or the potential is compared in an absolute value, unless otherwise stated.

In such an image forming apparatus, toner on an intermediate transfer belt tends to receive discharge between the intermediate transfer belt and a photosensitive drum at a portion downstream of a primary transfer portion, and the charge amount of the toner tends to increase. An increase in the charge amount of the toner on the intermediate transfer belt increases the reflection force between the toner and the intermediate transfer belt, and this leads to difficulty in transferring the toner to a recording material in a secondary transfer portion. For example, an increase in a secondary transfer electric field for transfer of the toner to the recording material in the secondary transfer portion causes deterioration of image graininess or causes difficulty in uniform transfer of toner to embossed paper having unevenness on its surface.

Japanese Patent Application Laid-Open No. 2003-57963 discusses a configuration in which a conductive abutment plate is disposed at a portion which is downstream of a primary transfer portion and on the inner peripheral surface of an intermediate transfer belt, and a bias having the same polarity as the charge polarity of a photosensitive drum is applied to the abutment plate.

The increase in the charge amount of the toner at a portion downstream of the primary transfer portion as described above is effectively prevented by preventing or reducing occurrence of discharge at a portion downstream of the primary transfer portion.

Japanese Patent Application Laid-Open No. 2003-57963 does not mention the technique for preventing or reducing occurrence of discharge at a portion downstream of the primary transfer portion.

SUMMARY

Occurrence of discharge at a portion downstream of the primary transfer portion is effectively prevented or reduced by disposing a potential regulation member that is a conductive electrode member at the portion downstream of the primary transfer portion and on the inner peripheral surface of the intermediate transfer belt and applying a bias (also referred to as a “potential regulation bias”) having the same polarity as the charge polarity of the photosensitive drum to the potential regulation member.

To effectively prevent or reduce occurrence of discharge at a portion downstream of the primary transfer portion and improve the secondary transfer property, it may be desirable to dispose the potential regulation member close to the primary transfer portion and increase the bias having the same polarity as the charge polarity of the photosensitive drum.

Utilization of the potential regulation member leads to the achievement of the secondary transfer efficiency of a chromatic color toner image, such as a two-color solid (e.g., magenta+cyan) toner image with a relatively low strength of a secondary transfer electric field. Meanwhile, utilization of the potential regulation member leads to a decrease in the secondary transfer efficiency of a black toner image. These findings may be caused by a position of an image forming unit that forms the black toner image or the properties of black toner.

The present disclosure is directed to obtaining, in a configuration in which a bias can be applied to an electrode member disposed downstream of a primary transfer portion, excellent secondary transfer properties of both toner that is primarily transferred to an intermediate transfer belt on the upstream side, and toner that is primarily transferred to the intermediate transfer belt on the downstream side.

The present disclosure is also directed to obtaining, in a configuration in which a bias can be applied to an electrode member disposed at a portion downstream of a primary transfer portion, excellent secondary transfer properties of both toner of a color other than black and black toner.

According to some embodiments, an image forming apparatus includes a first photosensitive member configured to bear a toner image, a second photosensitive member configured to bear a toner image, a first blade disposed in contact with the first photosensitive member and configured to clean toner remaining on the first photosensitive member, a second blade disposed in contact with the second photosensitive member and configured to clean toner remaining on the second photosensitive member, an intermediate transfer belt capable of a rotation movement and configured to be in contact with the first and second photosensitive members to form first and second primary transfer portions, convey the toner images primarily transferred from the first and second photosensitive members in the first and second primary transfer portions, respectively, to secondarily transfer the toner images to a recording material in a secondary transfer portion, a first primary transfer member configured to be in contact with an inner peripheral surface of the intermediate transfer belt, to be applied with a primary transfer bias, and primarily transfer the toner image from the first photosensitive member to the intermediate transfer belt, a second primary transfer member configured to be in contact with the inner peripheral surface of the intermediate transfer belt, to be applied with a primary transfer bias, and primarily transfer the toner image from the second photosensitive member to the intermediate transfer belt, a first electrode member disposed corresponding to the first photosensitive member and configured to be in contact with the inner peripheral surface of the intermediate transfer belt in a position downstream of the first primary transfer portion in a moving direction of the intermediate transfer belt, a second electrode member disposed corresponding to the second photosensitive member and configured to be in contact with the inner peripheral surface of the intermediate transfer belt in a position downstream of the second primary transfer portion in the moving direction of the intermediate transfer belt, an application section configured to apply biases to the first and second electrode members, and a control section configured to control the application section, wherein the first photosensitive member is disposed upstream of the second photosensitive member and downstream of the secondary transfer portion in the moving direction of the intermediate transfer belt, and wherein the control section controls the application section in such a manner that in a case where image formation to form an image on the recording material by transferring the toner images formed on the first and second photosensitive members to the recording material is performed, an absolute value of the bias to be applied to the second electrode member is set to be smaller than an absolute value of the bias to be applied to the first electrode member.

Further features of the present disclosure will become apparent from the following description of exemplary embodiments with reference to the attached drawings.

DESCRIPTION OF THE EMBODIMENTS

The image forming apparatus according to the present disclosure will be described in more detail with reference to the drawings.

1. Overall Configuration and Operation of Image Forming Apparatus

Figure 1:
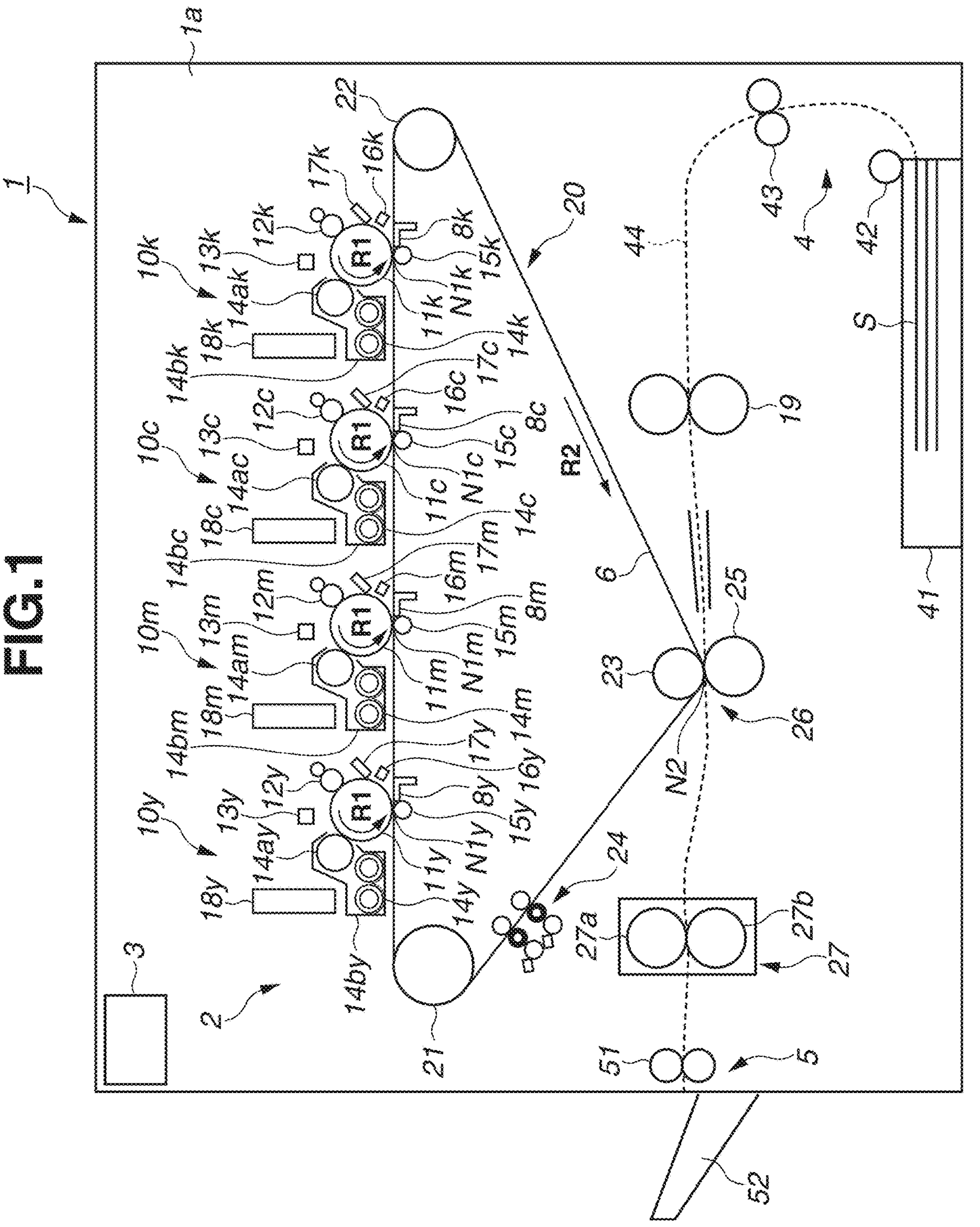
FIG. 1 is a schematic cross-sectional view of an image forming apparatus.

The overall configuration and operation of an image forming apparatus according to a first exemplary embodiment are described. FIG. 1 is a schematic cross-sectional view of an image forming apparatus 1 according to the present exemplary embodiment. The image forming apparatus 1 according to the present exemplary embodiment is a tandem full-color printer employing an intermediate transfer method and capable of forming a full-color image on a sheet-like recording material S using an electrophotographic method.

The image forming apparatus 1 includes an image forming section 2, a control section 3, a feeding section 4 for feeding the recording material S, and a discharge section 5 for discharging the recording material S. Inside the image forming apparatus 1, a temperature sensor 71 (in FIG. 2) capable of detecting the temperature inside the apparatus and a humidity sensor 72 (in FIG. 2) capable of detecting the humidity inside the apparatus are disposed. Each of the temperature sensor 71 and the humidity sensor 72 is an example of environment detection means that detects an environment of at least one of the inside and the outside of the image forming apparatus 1. Based on image information (an image signal) acquired by a document reading device (not illustrated) disposed in the image forming apparatus 1 or connected to the image forming apparatus 1, the image forming apparatus 1 can form an image on the recording material S. Based on image information (an image signal) from an external device (not illustrated), such as a personal computer (a host device), a digital camera, or a smartphone connected to the image forming apparatus 1, the image forming apparatus 1 can form an image on the recording material S. The recording material (a transfer material, a recording medium, or a sheet) S is a recording material on which an image is formed using toner. Specific examples of the recording material S include plain paper, thick paper, gloss coated paper, matte coated paper, embossed paper, and substitutes for plain paper, such as a synthetic resin sheet (synthetic paper) and an overhead projector sheet (a resin film). While the recording material S is occasionally referred to as "paper" (e.g., "paper", "embossed paper", or "high-resistance paper"), even in this case, the recording material S includes a recording material formed of a material other than paper or a material including a material other than paper.

Based on image information, the image forming section 2 forms an image on the recording material S fed from the feeding section 4. The image forming section 2 includes image forming units 10*y*, 10*m*, 10*c*, and 10*k*, toner bottles

18*y*, 18*m*, 18*c*, and 18*k*, exposure devices 13*y*, 13*m*, 13*c*, and 13*k*, an intermediate transfer unit 20, a secondary transfer device 26, and a fixing device 27. The image forming units 10*y*, 10*m*, 10*c*, and 10*k* form toner images of yellow (Y), magenta (M), cyan (C), and black (K) colors, respectively. Components disposed for the respective colors and having the same or corresponding functions or configurations are occasionally collectively described by omitting "y", "m", "c", and "k" at the ends of the signs indicating that the components correspond to the respective colors. For example, components for the respective colors are occasionally referred to simply as a component for each color, such as "the image forming unit 10*y* for yellow". The image forming apparatus 1 can also form a monochromatic image, such as a black monochromatic image, or a multicolor image using an image forming unit 10 for a single desired color or image forming units 10 for some desired colors among the four colors.

The image forming unit 10 includes a photosensitive drum 11 that is a drum-type (cylindrical) photosensitive member (electrophotographic photosensitive member) as an image bearing member. The image forming unit 10 includes a charging roller 12 that is a roller-type charging member as charging means. The image forming unit 10 includes a development device 14 as development means. The image forming unit 10 includes a pre-exposure device 16 as static elimination means. The image forming unit 10 includes a drum cleaning device 17 as photosensitive member cleaning means. The image forming unit 10 forms a toner image on an intermediate transfer belt 6.

The photosensitive drum 11 can move (rotate) while bearing an electrostatic image (an electrostatic latent image) or a toner image. In the present exemplary embodiment, the photosensitive drum 11 is a negatively charged organic photoconductor (OPC) having an outer diameter of 30 millimeters (mm). The photosensitive drum 11 includes an aluminum cylinder as a base and a surface layer formed on the surface of the base. In the present exemplary embodiment, the photosensitive drum 11 includes three layers, namely an undercoat layer, an optical charge generation layer, and a charge transport layer that have been applied from the base and stacked in this order, as the surface layer. When an image forming operation is started, the photosensitive drum 11 is rotationally driven in the direction of an arrow R1 (the counterclockwise direction) in FIG. 1 at a predetermined peripheral speed (process speed) by a driving motor (not illustrated) as driving means.

The surface of the rotating photosensitive drum 11 is uniformly subjected to a charging process by the charging roller 12. In the present exemplary embodiment, the charging roller 12 is a rubber roller that is in contact with the surface of the photosensitive drum 11 and rotates by the rotation of the photosensitive drum 11. To the charging roller 12, a charging power supply 73 (in FIG. 2) as charging bias application means (a charging bias application section) is connected. In the charging process, the charging power supply 73 applies a predetermined charging bias (charging voltage) to the charging roller 12.

The surface of the photosensitive drum 11 subjected to the charging process is scanned and exposed based on image information by the exposure device 13, whereby an electrostatic image is formed on the photosensitive drum 11. In the present exemplary embodiment, the exposure device 13 is a laser scanner. The exposure device 13 emits laser light according to image information regarding a separation color output from the control section 3 and scans and exposes the surface (the outer peripheral surface) of the photosensitive drum 11.

The electrostatic image formed on the photosensitive drum 11 is developed (visualized) with toner by the development device 14 supplying toner. Then, a toner image (a developer image) is formed on the photosensitive drum 11. In the present exemplary embodiment, the development device 14 is a two-component development device that uses a two-component developer including toner (nonmagnetic toner particles) and a carrier (magnetic carrier particles) as a developer. A development container (development container main body) 14*b* of the development device 14 stores the two-component developer, and an amount of toner equivalent to consumed toner is replenished from the toner bottle 18. The development device 14 includes a development sleeve 14*a* as a development member (a developer bearing member). The development sleeve 14*a* includes a nonmagnetic material, such as aluminum or nonmagnetic stainless steel (aluminum in the present exemplary embodiment). Inside the development sleeve 14*a*, a magnetic roller (not illustrated) that is a roller-form magnet as magnetic field generation means (a magnetic field generation member) is fixedly disposed in such a manner that the magnetic roller does not rotate relative to the development container 14*b*. The development sleeve 14*a* bears the two-component developer and conveys the two-component developer to a development region facing the photosensitive drum 11. Then, in the development region, toner moves from the two-component developer on the development sleeve 14*a* to an image portion of the electrostatic image on the photosensitive drum 11 and attach to the image portion. To the development sleeve 14*a*, a development power supply 74 (in FIG. 2) as a development bias application means (a development bias application section) is connected. In development of the electrostatic image, the development power supply 74 applies a predetermined development bias (development voltage) to the development sleeve 14*a*. In the present exemplary embodiment, toner charged to the same polarity (a negative polarity in the present exemplary embodiment) as the charge polarity of the photosensitive drum 11 attach to the exposed portion (the image portion) on the photosensitive drum 11 in which the absolute value of the potential is decreased by uniformly performing the charging process on the photosensitive drum 11 and then exposing the photosensitive drum 11 (a reversal development method). In the present exemplary embodiment, the normal charge polarity of the toner that is the main charge polarity of the toner when the electrostatic image is developed is a negative polarity.

The intermediate transfer unit 20 is disposed in such a manner that the intermediate transfer unit 20 faces the four photosensitive drums 11*y*, 11*m*, 11*c*, and 11*k*. The intermediate transfer unit 20 includes the intermediate transfer belt 6 composed of an endless belt as an intermediate transfer member. The intermediate transfer belt 6 is stretched around a driving roller 21, a tension roller 22, and a secondary transfer inner roller 23. The intermediate transfer belt 6 can move (rotate) while bearing a toner image.

To the intermediate transfer belt 6, a driving force is transmitted by the driving roller 21 being rotationally driven by a driving motor (not illustrated) as driving means. Then, the intermediate transfer belt 6 rotates (performs a rotation movement) in the direction of an arrow R2 (the clockwise direction) in FIG. 1 at a predetermined peripheral speed corresponding to the peripheral speed of each photosensitive drum 11. The tension roller 22 controls the tension of the intermediate transfer belt 6 to be constant. To the tension roller 22, a force to push the intermediate transfer belt 6 in a direction from the inner peripheral surface (the back surface) toward the outer peripheral surface (the front surface) by the biasing force of a tension spring (not illustrated) including a compression coil spring that is a biasing member as biasing means. This force applies a tension of about 2 kgf to 5 kgf to the intermediate transfer belt 6 in the conveyance direction (the process movement direction, the moving direction) of the intermediate transfer belt 6. The secondary transfer inner roller 23 forms the secondary transfer device 26 with a secondary transfer outer roller 25. On the inner peripheral surface of the intermediate transfer belt 6, primary transfer rollers 15*y*, 15*m*, 15*c*, and 15*k* that are roller-type primary transfer members as primary transfer means are disposed in positions corresponding to the photosensitive drums 11*y*, 11*m*, 11*c*, and 11*k*, respectively. In the present exemplary embodiment, the primary transfer rollers 15 are each disposed in a position facing the corresponding one of the photosensitive drums 11, and the primary transfer rollers 15 and the photosensitive drums 11 nip the intermediate transfer belt 6. The primary transfer rollers 15 are pressed toward the photosensitive drums 11, abut the photosensitive drums 11 via the intermediate transfer belt 6, and each form a primary transfer portions (primary transfer nip portion) N1 that is an abutment portion between the photosensitive drums 11 and the intermediate transfer belt 6. The stretching rollers other than the driving roller 21 and the primary transfer rollers 15 rotate driven according to the rotation of the intermediate transfer belt 6.

A toner image formed on the photosensitive drum 11 is transferred (primarily transferred) onto the rotating intermediate transfer belt 6 by the action of the primary transfer roller 15 in the primary transfer portion N1. For example, in formation of a full-color image, toner images of yellow, magenta, cyan, and black colors formed on the photosensitive drums 11 are subjected to multiple transfer so that the toner images are sequentially superimposed on the intermediate transfer belt 6. To the primary transfer roller 15, a primary transfer power supply 75 (FIG. 2) serving as primary transfer bias application means (a primary transfer bias application section) is connected. In the primary transfer, the primary transfer power supply 75 applies a predetermined primary transfer bias (primary transfer voltage) that is a direct-current voltage having a polarity (a positive polarity in the present exemplary embodiment) opposite to the normal charge polarity of the toner to the primary transfer roller 15. Consequently, the toner image having the negative polarity on the photosensitive drum 11 is primarily transferred onto the intermediate transfer belt 6. To the primary transfer power supply 75, a voltage detection sensor 75*a* (FIG. 2) serving as voltage detection means (a voltage detection section) that detects the output voltage of the primary transfer power supply 75, and a current detection sensor 75*b* (FIG. 2) serving as current detection means (a current detection section) that detects the output current of the primary transfer power supply 75, are connected. In the present exemplary embodiment, for example, a primary transfer bias of about 1 kV to 2 kV ("to" indicates a range including numerical values before and after "to"; the same applies to the following) is applied to the primary transfer roller 15. In the present exemplary embodiment, the primary transfer bias is subjected to constant voltage control. In the present exemplary embodiment, the primary transfer power supplies 75 (75*y*, 75*m*, 75*c*, and 75*k*) are independently disposed for the primary transfer rollers 15 (15*y*, 15*m*, 15*c*, and 15*k*), respectively. In the present exemplary embodiment, the primary transfer biases applied from the primary transfer power supplies 75 (75*y*, 75*m*, 75*c*, and 75*k*) to the primary transfer rollers 15 (15*y*, 15*m*, 15*c*, and 15*k*) can be individually controlled.

In the present exemplary embodiment, the primary transfer rollers 15 each include a metal core and an elastic layer of ion-conductive foamed rubber (nitrile rubber (NBR)) formed around the metal core. The outer diameter of the primary transfer roller 15 is 15 to 20 mm, for example. As the primary transfer roller 15, a roller having an electrical resistance value of $1\times10^5$ Ω to $1\times10^8$ Ω (N/N (23° C., a relative humidity (RH) of 50%) measurement, 2-kV application) can be suitably used.

In the present exemplary embodiment, the intermediate transfer belt 6 is an endless belt having a two-layer structure in which a base layer and a surface layer have been stacked in this order from the inner peripheral surface to the outer peripheral surface. As a material forming the base layer, a material that is a resin such as polyimide or polycarbonate and contains an appropriate amount of carbon black serving as an antistatic agent can be suitably used. The thickness of the base layer is 0.05 to 0.15 mm, for example. As a material forming the surface layer, polychloroprene (CR) rubber to which conductivity is imparted by carbon black can be suitably used. The thickness of the surface layer is 0.200 to 0.300 mm, for example. In the present exemplary embodiment, the volume resistivity of the intermediate transfer belt 6 is $5\times10^8$ Ω·cm to $1\times10^{14}$ Ω·cm (23° C., an RH of 50%). While the intermediate transfer belt 6 has a two-layer structure in the present exemplary embodiment, for example, the intermediate transfer belt 6 may be configured with a single layer of a material equivalent to that of the base layer. The surface layer may be a resin-coated layer having a thickness of about 0.002 to 0.01 mm including a resin such as fluororesin. The intermediate transfer belt 6 may be configured with multiple layers such as three or more layers.

On the outer peripheral surface of the intermediate transfer belt 6, the secondary transfer outer roller 25 that is a roller-type secondary transfer member serving as secondary transfer means is disposed. The secondary transfer outer roller 25 as the secondary transfer member forms the secondary transfer device 26 with the secondary transfer inner roller 23 serving as an opposing member (an opposing electrode). The secondary transfer outer roller 25 is pressed toward the secondary transfer inner roller 23, abuts the secondary transfer inner roller 23 via the intermediate transfer belt 6, and forms a secondary transfer portion (secondary transfer nip portion) N2 that is an abutment portion between the intermediate transfer belt 6 and the secondary transfer outer roller 25. The toner image formed on the intermediate transfer belt 6 is transferred (secondarily transferred) onto the recording material S that has been conveyed while being nipped by the intermediate transfer belt 6 and the secondary transfer outer roller 25, by the action of the secondary transfer device 26 in the secondary transfer portion N2. To the secondary transfer outer roller 25, a secondary transfer power supply 76 (FIG. 2) serving as secondary transfer bias application means (a secondary transfer bias application section) is connected. In the secondary transfer, the secondary transfer power supply 76 applies a predetermined secondary transfer bias (secondary transfer voltage) that is a direct-current voltage having a polarity (a positive polarity in the present exemplary embodiment) opposite to the normal charge polarity of the toner to the secondary transfer outer roller 25. Consequently, the toner image having the negative polarity on the intermediate transfer belt 6 is secondarily transferred onto the recording material S. To the secondary transfer power supply 76, a voltage detection sensor 76*a* (FIG. 2) serving as voltage detection means (a voltage detection section) that detects the output voltage of the secondary transfer power supply 76, and a current detection sensor 76*b* (FIG. 2) serving as current detection means (a current detection section) that detects the output current of the secondary transfer power supply 76, are connected. A metal core of the secondary transfer inner roller 23 is connected to a ground potential. In the present exemplary embodiment, for example, a secondary transfer bias of about 1 kV to 6.5 kV is applied to the secondary transfer outer roller 25, and a secondary transfer current of about 15 μA to 100 μA is applied to the secondary transfer portion N2, whereby the toner image on the intermediate transfer belt 6 is secondarily transferred onto the recording material S. In the present exemplary embodiment, the secondary transfer bias is subjected to constant voltage control.

A configuration in which the secondary transfer power supply 76 applies a secondary transfer bias that is a direct-current voltage having the same polarity as the normal charge polarity of the toner to the secondary transfer inner roller 23 as a secondary transfer member, and the secondary transfer outer roller 25 as a facing member is connected to a ground potential. The secondary transfer outer roller 25 may be configured to be rotationally driven by the rotation of the intermediate transfer belt 6, or may be configured to be rotationally driven by driving means.

The recording material S is conveyed from the feeding section 4 to the secondary transfer portion N2 in parallel with the operation of forming the toner image on the intermediate transfer belt 6. Recording materials S are stored in a cassette 41 serving as a recording material storage portion of the feeding section 4. The recording materials S stored in the cassette 41 are separated one by one by a feeding roller 42 serving as a feeding member of the feeding section 4, and each recording material S is sent out from the cassette 41. The recording material S is conveyed to registration rollers (a registration roller pair) 19 serving as a conveyance member disposed in a conveyance passage (conveyance path) 44 of the recording material S by conveyance rollers 43 serving as a conveyance member of the feeding section 4. The recording material S is conveyed to the secondary transfer portion N2 by the registration rollers 19 in synchronization with the toner image on the intermediate transfer belt 6. Although FIG. 1 illustrates only the cassette 41, the image forming apparatus 1 may include a plurality of cassettes 41. The feeding section 4 may also be able to feed the recording material S from a recording material storage portion (a recording material placement portion) other than the cassette 41, such as a manual-bypass tray.

In the present exemplary embodiment, the secondary transfer outer roller 25 includes a metal core and an elastic layer of ion-conductive foamed rubber (NBR) formed around the metal core. The outer diameter of the secondary transfer outer roller 25 is 20 to 25 mm, for example. As the secondary transfer outer roller 25, a roller having an electrical resistance value of $1\times10^5\ \Omega$ to $1\times10^8\ \Omega$ (N/N (23° C., an RH of 50%) measurement, 2-kV application) can be suitably used.

Figure 2:
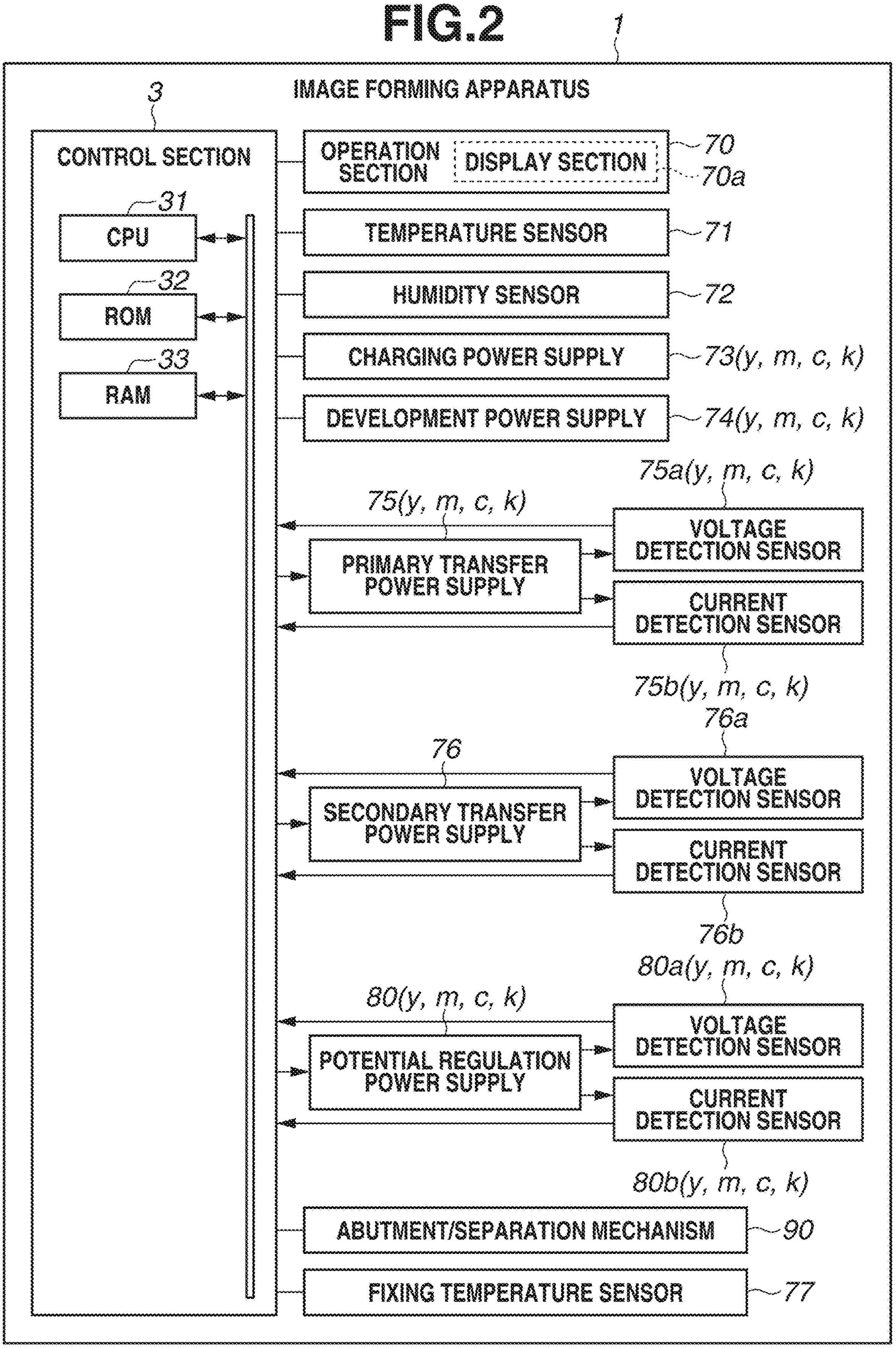
FIG. 2 is a schematic block diagram of a control system of the image forming apparatus.

The recording material S to which the toner image is transferred is conveyed to the fixing device 27 serving as fixing means. The fixing device 27 includes a fixing roller 27*a* and a pressure roller 27*b*. The fixing roller 27*a* has a heater serving as built-in heating mean. The pressure roller 27*b* is in pressure contact with the fixing roller 27*a* and forms a fixing portion (a fixing nip portion). The fixing device 27 nips and conveys the recording material S bearing the unfixed toner image between the fixing roller 27*a* and the pressure roller 27*b*, whereby the recording material S is heated and pressurized, and the toner image is fixed (melted or firmly fixed) onto the recording material S. The temperature (the fixing temperature) of the fixing roller 27*a* is detected by a fixing temperature sensor 77 (FIG. 2). The recording material S to which the toner image is fixed is conveyed by discharge rollers 51 in the discharge section 5 and discharged (output) onto a discharge tray 52 disposed outside an apparatus main body 1*a* of the image forming apparatus 1 (hereinafter also referred to simply as an "apparatus main body") through a discharge opening (not illustrated).

From the surface of the photosensitive drum 11 after the primary transfer, static is eliminated by the pre-exposure device 16. Toner remaining on the photosensitive drum 11 without being transferred to the intermediate transfer belt 6 in the primary transfer (primary transfer residual toner) is removed from the photosensitive drum 11 and collected by the drum cleaning device 17. In the present exemplary embodiment, the drum cleaning device 17 scrapes the primary transfer residual toner from the surface of the rotating photosensitive drum 11 using a cleaning blade serving as a cleaning member and collects the primary transfer residual toner in a collection container (not illustrated). The cleaning blade is a plate-like member that abuts the photosensitive drum 11 with a predetermined pressing force. The cleaning blade abuts the surface of the photosensitive drum 11 in a counter direction to the rotational direction of the photosensitive drum 11 so that an end on the free end portion of the cleaning blade is directed upstream in the rotational direction of the photosensitive drum 11. Attached substances such as toner remaining on the intermediate transfer belt 6 without being transferred to the recording material S in the secondary transfer (secondary transfer residual toner) are removed from the intermediate transfer belt 6 and collected by a belt cleaning device 24 serving as intermediate transfer member cleaning means.

The image forming units 10 may each be configured in a form of a cartridge (a process cartridge) attachable to and detachable from the apparatus main body 1*a* in an integrated manner. In the present exemplary embodiment, the intermediate transfer unit 20 includes the intermediate transfer belt 6, the stretching rollers of the intermediate transfer belt 6, the primary transfer rollers 15, the belt cleaning device 24, and potential regulation members 8. The intermediate transfer unit 20 may be attachable to and detachable from the apparatus main body 1*a* in an integrated manner.

In the present exemplary embodiment, the image forming apparatus 1 can perform image formation in a full-color mode (a first mode) and a black monochromatic mode (a monochrome mode, a second mode) as an image forming mode. In the full-color mode, the image forming apparatus 1 can form a full-color image by forming yellow, magenta, cyan, and black toner images in the four image forming units 10*y*, 10*m*, 10*c*, and 10*k*, respectively. In the black monochromatic mode, the image forming apparatus 1 can form a black monochromatic image by forming a black toner image in only the image forming unit 10*k* for black among the four image forming units 10*y*, 10*m*, 10*c*, and 10*k*. Based on a mode selection instruction or image information contained in information regarding a job (image forming information), the control section 3 can switch the image forming mode to the full-color mode and the black monochromatic mode.

In the present exemplary embodiment, the image forming apparatus 1 includes an abutment/separation mechanism 90

(FIG. 2) that causes the intermediate transfer belt 6 to abut and separate from the photosensitive drums 11*y*, 11*m*, and 11*c* for yellow, magenta, and cyan, respectively. The abutment/separation mechanism 90 brings the intermediate transfer belt 6 to abut the photosensitive drum photosensitive drums 11*y*, 11*m*, and 11*c* for yellow, magenta, and cyan, respectively, to bring the intermediate transfer belt 6 into an abutment/separation state where the intermediate transfer belt 6 abuts all the photosensitive drums 11*y*, 11*m*, 11*c*, and 11*k* (an "all-abutment state"). The abutment/separation mechanism 90 brings the intermediate transfer belt 6 to separate from the photosensitive drums 11*y*, 11*m*, and 11*c* for yellow, magenta, and cyan, respectively, to bring the intermediate transfer belt 6 into an abutment/separation state where the intermediate transfer belt 6 abuts only the photosensitive drum 11*k* for black among the four photosensitive drums 11 (a "black abutment state"). For example, the control section 3 controls the abutment/separation mechanism 90 according to the image forming mode, so that the abutment/separation state of the photosensitive drums 11 and the intermediate transfer belt 6 can be switched to the all-abutment state and the black abutment state. In the full-color mode, the control section 3 switches the abutment/separation state of the photosensitive drums 11 and the intermediate transfer belt 6 to the all-abutment state. In the black monochromatic mode, the control section 3 can select the black abutment state as the abutment/separation state of the photosensitive drums 11 and the intermediate transfer belt 6. In the present exemplary embodiment, however, in both the all-abutment state and the black abutment state as the abutment/separation state, the image forming apparatus 1 can form a black monochromatic image by forming only a black toner image. In a case where image formation is performed in the black abutment state, the rotation of the photosensitive drums 11 and the development sleeves 14*a* of the image forming units 10*y*, 10*m*, and 10*c* for yellow, magenta, and cyan, respectively, is stopped.

2. Control Configuration

FIG. 2 is a block diagram illustrating the general configuration of a control system of the image forming apparatus 1 according to the present exemplary embodiment. In the image forming apparatus 1, the control section (control circuit) 3 as a control method is disposed. The control section 3 includes a central processing unit (CPU) 31 serving as calculation processing means, a read-only memory (ROM) (including a rewritable ROM) 32, a random-access memory (RAM) 33 serving as storage means, and an input/output circuit (interface (I/F)) (not illustrated) that inputs and outputs signals between the control section 3 and a device outside the control section 3. The ROM 32 stores a program for controlling the components of the image forming apparatus 1. The RAM 33 temporarily stores data regarding control. The CPU 31 is a microprocessor that performs overall control of the image forming apparatus 1, and is a main part of a system controller. The CPU 31 is connected to components such as the feeding section 4, the image forming section 2, and the discharge section 5, exchanges signals with these components, and also controls the operations of these components. The ROM 32 stores an image forming control sequence for forming an image on the recording material S.

To the control section 3, for example, the charging power supplies 73, the development power supplies 74, the primary transfer power supplies 75, the secondary transfer power supply 76, potential regulation power supplies 80, and the abutment/separation mechanism 90 are connected. These components are controlled according to signals from the control section 3. Although not illustrated in Figures, in the present exemplary embodiment, the charging power supplies 73 (73*y*, 73*m*, 73*c*, and 73*k*), the development power supplies 74 (74*y*, 74*m*, 74*c*, and 74*k*), the primary transfer power supplies 75 (75*y*, 75*m*, 75*c*, and 75*k*), and the potential regulation power supplies 80 (80*y*, 80*m*, 80*c*, and 80*k*) are independently disposed for the image forming units 10 (10*y*, 10*m*, 10*c*, and 10*k*). To the control section 3, the temperature sensor 71, the humidity sensor 72, the voltage detection sensors 75*a* (75*ay*, 75 am, 75*ac*, and 75*ak*) and the current detection sensors 75*b* (75*by*, 75*bm*, 75*bc*, and 75*bk*) of the primary transfer power supplies 75, the voltage detection sensor 76*a* and the current detection sensor 76*b* of the secondary transfer power supply 76, voltage detection sensors 80*a* and current detection sensors 80*b* of the potential regulation power supplies 80, and the fixing temperature sensor 77 are connected. A signal (information) indicating the detection result of each sensor is input to the control section 3.

To the control section 3, an operation section 70 is connected. The operation section 70 includes an input section including an operation button (key) serving as input means and a display section 70*a* including a liquid crystal panel (display) serving as display means. In the present exemplary embodiment, the display section 70*a* is configured as a touch panel and also has a function of input means. An operator, such as a user or a service person, can cause the image forming apparatus 1 to execute a job (described below) by operating the operation section 70. The control section 3 receives a signal from the operation section 70 and causes various devices of the image forming apparatus 1 to operate. The image forming apparatus 1 can also execute a job according to a signal from an external device, such as a personal computer, instead of the operation section 70.

The image forming apparatus 1 executes a job (a print job, an image forming operation) that is a series of operations for formation and outputting of images on one or more recording materials S that is started according to a single start instruction. The job generally includes an image forming step, a pre-rotation step, an inter-paper step in a case of formation of images on a plurality of recording materials S, and a post-rotation step. The image forming step refers to a period when an electrostatic image of an image to be actually formed and output on a recording material S is formed, a toner image is formed, and the toner image is primarily transferred and secondarily transferred. An image forming time (an image forming period) refers to this period. More particularly, the timing of the image forming time differs in accordance with the positions where the steps of forming an electrostatic image, forming a toner image, primarily transferring the toner image, and secondarily transferring the toner image are performed. The pre-rotation step is a period when a preparation operation before the image forming step is performed, from when a start instruction is input to when an image actually starts to be formed. The inter-paper step (an inter-recording-material step, an inter-image step) is a period corresponding to, when image formation is continuously performed on a plurality of recording materials S (continuous printing, continuous image formation), a period between the recording materials S. The post-rotation step is a period when an arrangement operation (a preparation operation) after the image forming step is performed. A non-image forming time (a non-image forming period) is a period other than the image forming time and includes the pre-rotation step, the inter-paper step, and the post-rotation step, and further includes a pre-multi-rotation step that is a preparation operation when the image forming apparatus 1 is powered on or when the image forming apparatus 1 returns from a sleep state.

3. Influence of Discharge Occurred at Portion Downstream of Primary Transfer Portion The influence of discharge occurred at a portion downstream of the primary transfer portion N1 is further described. For convenience, the magnitude (the relative height) of a voltage or a potential refers to the relative magnitude (the relative height) in comparison to the voltage or the potential in an absolute value, unless otherwise stated. Regarding the position of the primary transfer portion N1, the photosensitive drum 11, the primary transfer roller 15, and the potential regulation member 8, "upstream" and "downstream" refer to upstream and downstream with respect to the conveyance direction (the process movement direction, the moving direction) of the intermediate transfer belt 6, unless otherwise stated.

As described above, the charge amount of toner on the intermediate transfer belt 6 tends to increase by receiving discharge between the intermediate transfer belt 6 and the photosensitive drum 11 at a portion downstream of the primary transfer portion N1. More particularly, the toner on the intermediate transfer belt 6 receiving the discharge, the distribution of the charge amount of the toner tends to be broader than the distribution of the charge amount of the toner on the photosensitive drum 11, and the average value of the charge amount of the toner tends to increase. It has been found that the increase in the charge amount of the toner on the intermediate transfer belt 6 increases the reflection force between the toner and the intermediate transfer belt 6, and this results in difficulty in transferring the toner to the recording material S in the secondary transfer portion N2. For example, with an increase in the charge amount of the toner on the intermediate transfer belt 6, a secondary transfer electric field used to transfer the toner to the recording material S in the secondary transfer portion N2 is increased, which can deteriorate the graininess of an image. For example, uniformly transferring the toner to embossed paper having unevenness on its surface is difficult because a relatively large secondary transfer electric field is used due to a gap between the intermediate transfer belt 6 and the paper in the secondary transfer portion N2. Thus, if the charge amount of the toner on the intermediate transfer belt 6 increases, it is more difficult to uniformly transfer the toner to embossed paper having unevenness on its surface. "Embossed paper" refers to paper (fancy paper) obtained by forming an uneven pattern on the surface of paper using an embossing or pattern embossing method.

To prevent an increase in the charge amount of the toner at a portion downstream of the primary transfer portion N1 as described above, preventing or reducing occurrence of discharge at a portion downstream of the primary transfer portion N1 is effective. The occurrence of discharge at a portion downstream of the primary transfer portion N1 is effectively prevented or reduced with a potential regulation member that is a conductive electrode member disposed downstream of the primary transfer portion N1 and on the inner peripheral surface of the intermediate transfer belt 6, and by applying a bias having the same polarity as the charge polarity of the photosensitive drum 11 to the potential regulation member.

4. Potential Regulation Member

The configuration of the potential regulation member 8 according to the present exemplary embodiment is described. As illustrated in FIG. 1, in the image forming apparatus 1 according to the present exemplary embodiment, in positions adjacent to and downstream of the primary transfer portions N1*y*, N1*m*, N1*c*, and N1*k*, the potential regulation members 8*y*, 8*m*, 8*c*, and 8*k*, respectively, serving as electrode members are disposed in contact with the inner peripheral surface of the intermediate transfer belt 6. In the present exemplary embodiment, the potential regulation members 8*y*, 8*m*, 8*c*, and 8*k* disposed for the primary transfer portions N1*y*, N1*m*, N1*c*, and N1*k*, respectively, have substantially the same configurations.

Figure 3A:
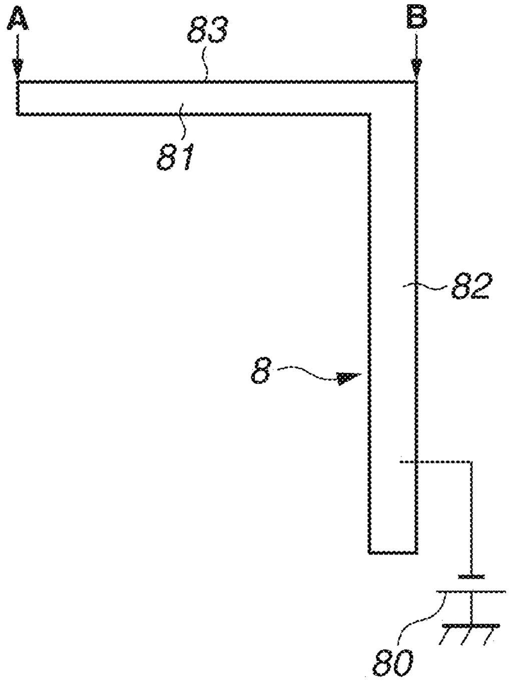
FIG. 3A is a cross-sectional view of a potential regulation member.
Figure 3B:
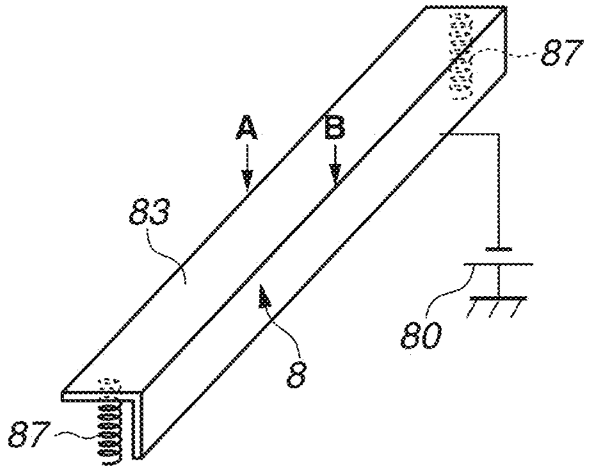
FIG. 3B is a perspective view of the potential regulation member.

The shape of the potential regulation member 8 according to the present exemplary embodiment is described. FIG. 3A is a cross-sectional view (a cross section approximately orthogonal to the rotational axis direction of the photosensitive drum 11) of the potential regulation member 8 according to the present exemplary embodiment. FIG. 3B is a perspective view of the potential regulation member 8 according to the present exemplary embodiment.

In the present exemplary embodiment, the potential regulation member 8 includes a first portion 81 in a planar form disposed in the width direction of the intermediate transfer belt 6 (a direction approximately orthogonal to the conveyance direction, a direction approximately parallel to the rotational axis direction of the photosensitive drum 11). In the present exemplary embodiment, the potential regulation member 8 includes a second portion 82 in a planar form disposed in the width direction of the intermediate transfer belt 6 and extending in a direction approximately orthogonal to the planar surface of the first portion 81. In the present exemplary embodiment, a contact surface 83 that is a contact portion of the first portion 81 of the potential regulation member 8 and is in contact with the inner peripheral surface of the intermediate transfer belt 6 has a planar surface. That is, in the present exemplary embodiment, the first portion 81 forming the contact surface 83 of the potential regulation member 8 is a flat plate.

In the cross section approximately orthogonal to the rotational axis direction of the photosensitive drum 11, an end portion on the upstream side of the contact surface 83 is defined as "A" (or an upstream end A), and an end portion on the downstream side of the contact surface 83 is defined as "B" (or a downstream end B). In the present exemplary embodiment, the upstream end A of the contact surface 83 corresponds to an end portion on the upstream side of the potential regulation member 8, and the downstream end B of the contact surface 83 corresponds to an end portion on the downstream side of the potential regulation member 8. To prevent or reduce the discharge between the intermediate transfer belt 6 and the photosensitive drum 11 more effectively by the action of an electric field formed in a space between the photosensitive drum 11 and the potential regulation member 8, it is desirable to bring the potential regulation member 8 into surface contact with the intermediate transfer belt 6. From this viewpoint, it is desirable that a contact width that is the length of a line segment AB, i.e., the length of the contact surface 83 in the conveyance direction of the intermediate transfer belt 6, is preferably 5 mm or more. The longer the length of the line segment AB is, the greater the effect of preventing or reducing the discharge is. If, however, the line segment AB is too long, there can be difficulty in stably bringing the potential regulation member 8 into contact with the intermediate transfer belt 6 under the influence of the component accuracy. The length of the line segment AB is 50 mm or less, which is often sufficient. Typically, the length of the line segment AB is 30 mm or less.

That is, it is desirable that the length of the line segment AB is preferably about 5 to 50 mm. Typically, the length of the line segment AB is about 5 to 30 mm. From another viewpoint, it can be said that the length of the line segment AB is half or less of the distance between the shafts of photosensitive drums 11 adjacent to each other in a cross section approximately orthogonal to the rotational axis direction of each photosensitive drum 11, which is often sufficient. In the present exemplary embodiment, a potential regulation member 8 in which the length of the line segment AB is 25 mm is used. In the present exemplary embodiment, the distance between the shafts of photosensitive drums 11 in a cross section approximately orthogonal to the rotational axis direction of each photosensitive drum 11 is about 100 mm.

To the potential regulation member 8, the potential regulation power supply 80 as potential regulation bias application means (a potential regulation bias application section) is connected. In the present exemplary embodiment, the potential regulation power supply 80 is connected to the second portion 82 of the potential regulation member 8. At least at the time when primary transfer is performed during an image forming operation, the potential regulation power supply 80 applies a predetermined potential regulation bias (potential regulation voltage) that is a direct-current voltage having the same polarity as the charge polarity of the photosensitive drum 11 to the potential regulation member 8. More particularly, the time when the primary transfer is performed is a period when the primary transfer bias is applied, more specifically, a period when an image region (a region to which a toner image can be transferred) on the intermediate transfer belt 6 passes through the primary transfer portion N1.

With the above-describe configuration, occurrence of discharge between the intermediate transfer belt 6 and the photosensitive drum 11 at a portion downstream of the primary transfer portion N1 is prevented or reduced. In the present exemplary embodiment, the potential regulation bias is a direct-current voltage having a negative polarity. In the present exemplary embodiment, the potential regulation bias is subjected to constant voltage control. In the configuration of the present exemplary embodiment, it is desirable that the potential regulation bias (a constant voltage having a positive polarity) is preferably about −500 V to −5000 V. It is more desirable that the potential regulation bias is preferably about −1000 V to −3000 V.

The potential regulation member 8 is a member long in the width direction of the intermediate transfer belt 6. It is desirable that the length in the longitudinal direction (a direction in the width direction of the intermediate transfer belt 6) of the contact surface 83 of the potential regulation member 8 is longer than the maximum image width in the width direction of the intermediate transfer belt 6. The maximum image width is the length of the image region of the largest image that can be formed by the image forming apparatus 1 in the width direction of the intermediate transfer belt 6. In the present exemplary embodiment, the length in the longitudinal direction of the contact surface 83 of the potential regulation member 8 is longer than the maximum image width and is longer than the width at which the primary transfer roller 15 is in contact with the intermediate transfer belt 6 in the width direction of the intermediate transfer belt 6. That is, in the present exemplary embodiment, the range of the maximum image width and the range of the width at which the primary transfer roller 15 is in contact with the intermediate transfer belt 6 in the width direction of the intermediate transfer belt 6 both fall within the range of the length in the longitudinal direction of the contact surface 83 of the potential regulation member 8.

Consequently, regardless of the length in the width direction of the intermediate transfer belt 6 of the toner image transferred to the intermediate transfer belt 6, the effect of preventing an increase in the charge amount of toner on the intermediate transfer belt 6 can be obtained by preventing or reducing occurrence of discharge. On the other hand, in the present exemplary embodiment, the length in the longitudinal direction of the potential regulation member 8 is shorter than the width of the intermediate transfer belt 6. That is, in the present exemplary embodiment, the range of the length in the longitudinal direction of the potential regulation member 8 falls within the range of the width of the intermediate transfer belt 6. This configuration can prevent or reduce occurrence of discharge between the potential regulation member 8 and a member near the intermediate transfer belt 6 due to end portions of the potential regulation member 8 protruding in the longitudinal direction further than end portions in the width direction of the intermediate transfer belt 6. Further, this configuration can reduce the risk of reducing the effect of preventing an increase in the charge amount of toner on the intermediate transfer belt 6 by preventing or reducing the discharge.

For example, the potential regulation member 8 can include a single conductive material alone. In the present exemplary embodiment, the potential regulation member 8 includes substantially a conductive metal such as stainless steel (SUS) alone. More particularly, in the present exemplary embodiment, the potential regulation member 8 is configured by forming the first portion 81 and the second portion 82 by bending a plate material of a metal, such as SUS (a metal plate). With this bending, the strength of the potential regulation member 8 is increased. In the present exemplary embodiment, neither the first portion 81 nor the second portion 82 of the potential regulation member 8 substantially deforms in the state where the image forming apparatus 1 is used. The present disclosure, however, is not limited to such a form, and the potential regulation member 8 may include two or more materials.

Figure 4:
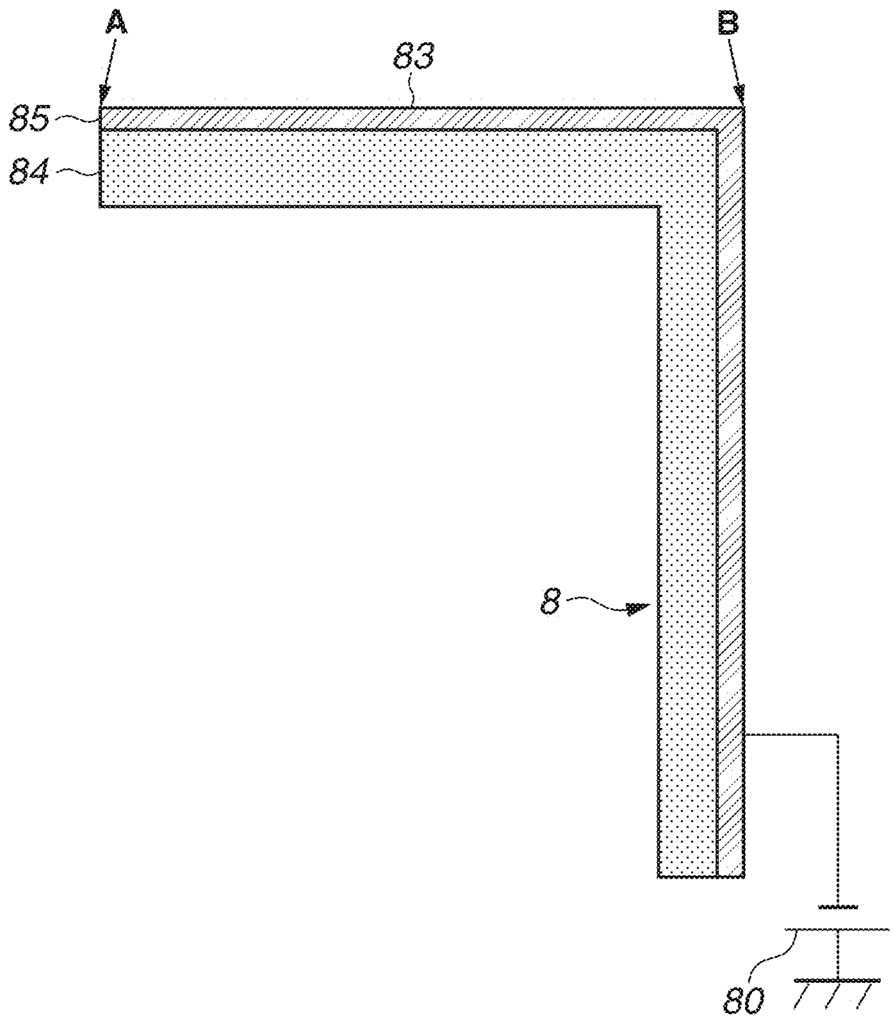
FIG. 4 is a cross-sectional view of another example of the potential regulation member.

FIG. 4 is a cross-sectional view (a cross section approximately orthogonal to the rotational axis direction of the photosensitive drum 11) of another example of the potential regulation member 8. For example, as illustrated in FIG. 4, a configuration in which the potential regulation member 8 includes a base portion 84 having a shape similar to that of the potential regulation member 8 illustrated in FIGS. 3A and 3B and a surface layer 85 disposed on the surface of the base portion 84 can be employed. The surface layer 85 included in a contact surface 83 that is in contact with the intermediate transfer belt 6, and serving as a connection portion with the potential regulation power supply 80 is made of a conductive material such as a metal or a conductive resin. The base portion 84 may be made of a conductive material, but may be made of a non-conductive material such as a non-conductive resin. The base portion 84 and the surface layer 85 can be fixed by any fixing means such as an adhesive or welding.

Figure 5:
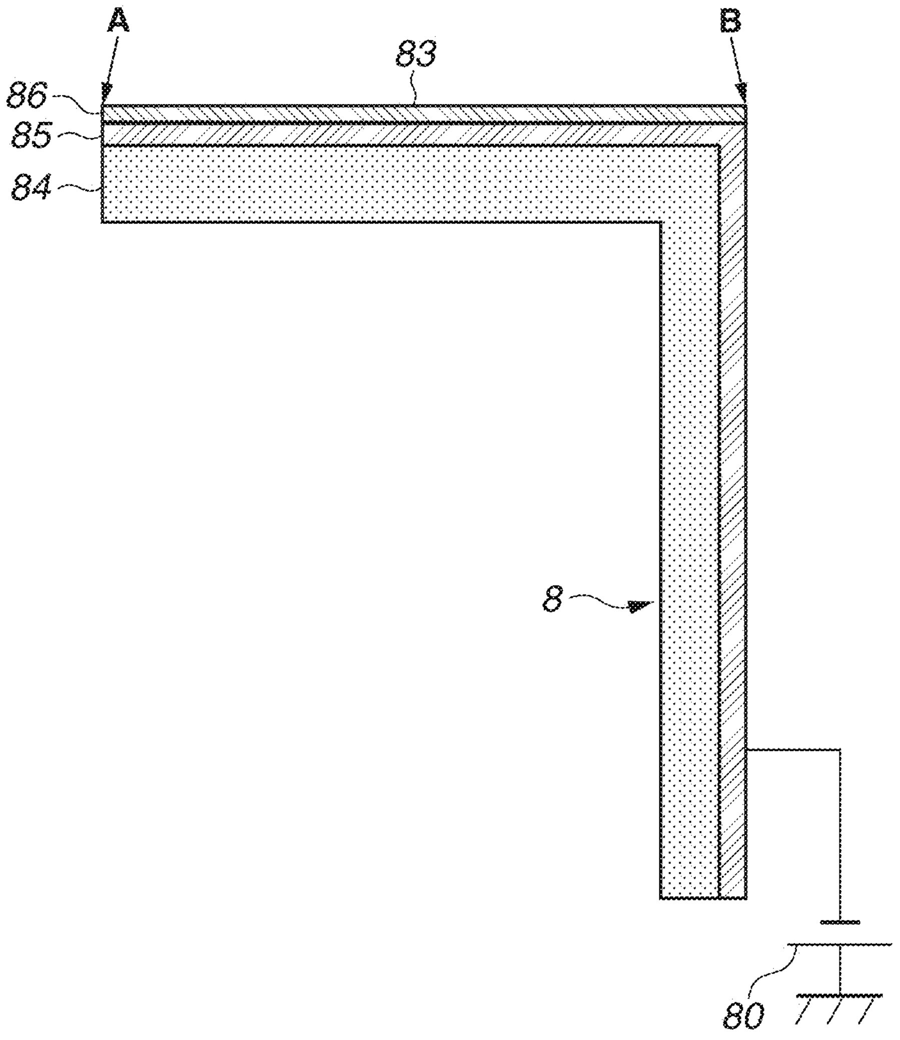
FIG. 5 is a cross-sectional view of yet another example of the potential regulation member.

FIG. 5 is a cross-sectional view (a cross section approximately orthogonal to the rotational axis direction of the photosensitive drum 11) of yet another example of the potential regulation member 8. For example, as illustrated in FIG. 5, the contact surface 83 of the potential regulation member 8 that is in contact with the intermediate transfer belt 6 may include a conductive non-woven fabric 86. Although in FIG. 5, the conductive non-woven fabric 86 is disposed on the contact surface 83 of the potential regulation member 8 in the configuration illustrated in FIG. 4, the conductive non-woven fabric 86 may be disposed on the contact surface 83 of the potential regulation member 8 in the configuration illustrated in FIGS. 3A and 3B. The conductive non-woven fabric 86 can be fixed by any fixing means such as a conductive adhesive. Instead of the conductive non-woven fabric 86, felt or a pile (a cut pile fabric (velvet or a brush) or a loop pile fabric (toweling)) configured using conductive fibers, or a sponge (a foamed elastic body) configured using a conductive rubber material may be used. As described above, the contact surface 83 of the potential regulation member 8 that is in contact with the intermediate transfer belt 6 includes a material having flexibility or elasticity, which reduces the risk that a scratch occurs on the inner peripheral surface of the intermediate transfer belt 6 by sliding friction between the inner peripheral surface of the intermediate transfer belt 6 and the potential regulation member 8.

Figure 6:
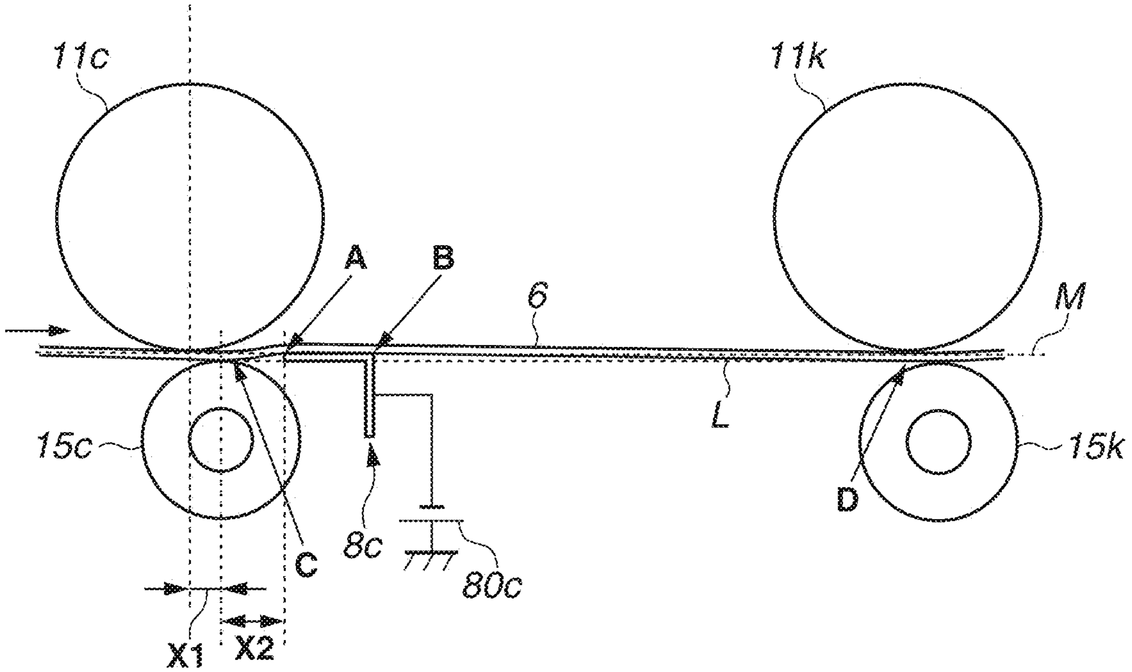
FIG. 6 is a cross-sectional view illustrating positions of the potential regulation members.

The position of the potential regulation member 8 according to the present exemplary embodiment is described. FIG. 6 is a cross-sectional view (a cross section approximately orthogonal to the rotational axis direction of each photosensitive drum 11) for describing the position of a potential regulation member 8 disposed between two primary transfer portions N1 adjacent to each other in the conveyance direction of the intermediate transfer belt 6. As an example, FIG. 6 illustrates the potential regulation member 8*c* for cyan disposed in a position adjacent to and downstream of the primary transfer portion N1*c* for cyan between the primary transfer portions N1*c* and N1*k* for cyan and black, respectively.

In the present exemplary embodiment, the outer diameter of the photosensitive drum 11 is 30 mm, the outer diameter of the primary transfer roller 15 is 18 mm, and the thickness of the intermediate transfer belt 6 is 0.350 mm. In the present exemplary embodiment, the primary transfer roller 15 is disposed with an offset downstream of the photosensitive drum 11. In the present exemplary embodiment, an offset amount X1 is 3 mm. The offset amount X1 is the distance between the rotational center of the photosensitive drum 11 and the rotational center of the primary transfer roller 15 in a direction along a common tangent on the side where the plurality of photosensitive drums 11 are in contact with the intermediate transfer belt 6 in the cross section approximately orthogonal to the rotational axis direction of each photosensitive drum 11.

To describe the position of the potential regulation member 8, a description will be given of a case in which the potential regulation member 8 is removed. In the cross section approximately orthogonal to the rotational axis direction of each photosensitive drum 11, a straight line passing through a tightened surface on the inner peripheral surface of the intermediate transfer belt 6 downstream of the primary transfer portion N1 in a case where the potential regulation member 8 is not disposed is defined as a straight line L. More particularly, the straight line L is equivalent to the tightened surface in the state where substantially only the potential regulation member 8 is removed from the configuration of the image forming apparatus 1 in the state during an image forming operation. On the straight line L, the place where the inner peripheral surface of the intermediate transfer belt 6 separates from the closest stretching member upstream of the potential regulation member 8 is defined as "C" (or an upstream stretching portion C), and the place where the inner peripheral surface of the intermediate transfer belt 6 separates from the closest stretching member downstream of the potential regulation member 8 is defined as "D" (or a downstream stretching portion D).

While FIG. 6 schematically illustrates the straight line L as approximately horizontal, if the surface of the primary transfer roller 15 is lifted toward the photosensitive drum 11 due to the deformation of the elastic layer of the primary transfer roller 15, the further downstream the straight line L is, the further downward in FIG. 6 the straight line L may be inclined.

In the present exemplary embodiment, the closest stretching member upstream of the potential regulation member 8 is the primary transfer roller 15, and the position on the inner peripheral surface of the intermediate transfer belt 6 of the place where the intermediate transfer belt 6 separates from the primary transfer roller 15 is the upstream stretching portion C. The closest stretching member upstream of the potential regulation member 8, however, is not limited to the primary transfer roller 15. For example, in a case where the primary transfer roller 15 is disposed in a position offset upstream of the photosensitive drum 11, the position on the inner peripheral surface of the intermediate transfer belt 6 of a place corresponding to the place where the intermediate transfer belt 6 separates from the photosensitive drum 11 is the upstream stretching portion C.

In the present exemplary embodiment, the stretching member in a position closest downstream of the potential regulation member 8 is each of the photosensitive drums 11*m*, 11*c*, and 11*k* disposed adjacent to and downstream of the primary transfer portions N1*y*, N1*m*, and N1*c* for yellow, magenta, and cyan, respectively. The position on the inner peripheral surface of the intermediate transfer belt 6 of a place corresponding to the place where the intermediate transfer belt 6 separates from each of the photosensitive drums 11*m*, 11*c*, and 11*k* is the downstream stretching portion D. The stretching member in a position closest downstream of the potential regulation member 8, however, is not limited to the photosensitive drum 11. For example, in a case where the primary transfer roller 15 is disposed in a position offset upstream of the photosensitive drum 11, the position on the inner peripheral surface of the intermediate transfer belt 6 of the place where the intermediate transfer belt 6 separates from the primary transfer roller 15 is the downstream stretching portion D. In the present exemplary embodiment, the closest stretching member downstream of the furthest downstream primary transfer portion, i.e., the primary transfer portion N1*k* for black, is the stretching roller (the tension roller in the present exemplary embodiment) 22. The position on the inner peripheral surface of the intermediate transfer belt 6 of the place where the intermediate transfer belt 6 separates from the stretching roller 22 is the downstream stretching portion D.

Further, as for any of the primary transfer portions N1, in a case where another stretching roller that restricts the orientation of the intermediate transfer belt 6 during the image forming operation is present as the closest stretching member downstream of the potential regulation member 8, the straight line L and the downstream stretching portion D are defined based on the stretching roller. Also in a case where a scraper or a brush instead of a stretching roller abuts the inner peripheral surface of the intermediate transfer belt 6 for the purpose of cleaning the inner peripheral surface of the intermediate transfer belt 6, the scraper or the brush can be regarded as the closest stretching member downstream of the potential regulation member 8 if the scraper or the brush restricts the orientation of the intermediate transfer belt 6 during the image forming operation. The scraper is generally composed of a sheet-like or film-like member.

As illustrated in FIG. 6, the potential regulation member 8 is disposed close to and downstream of the primary transfer portion N1 so that the potential regulation member 8 is not in contact with the primary transfer roller 15 and abut the photosensitive drum 11 via the intermediate transfer belt 6. In this configuration, the closer to the primary transfer portion N1 the upstream end A is, the greater the effect of preventing or reducing the discharge is. In the present exemplary embodiment, the potential regulation member 8 is disposed in a position downstream of the primary transfer portion N1 so that a distance X2 from the primary transfer roller 15 to the upstream end A is about 8 mm. The distance X2 is the distance between the rotational center of the primary transfer roller 15 and the upstream end A in the direction along the common tangent on the side where the plurality of photosensitive drums 11 is in contact with the intermediate transfer belt 6 in the cross section approximately orthogonal to the rotational axis direction of each photosensitive drum 11. That is, in the present exemplary embodiment, in the direction along the common tangent, the distance from the rotational center of the primary transfer roller 15 to the upstream end A is smaller than the distance (the radius) from the rotational center of the primary transfer roller 15 to the outer periphery of the primary transfer roller 15. While the present disclosure is not limited to this, it is desirable that the distance X2 is preferably about 1 mm to 20 mm. Typically, the distance X2 is about 1 mm to 10 mm.

Then, in the present exemplary embodiment, in each end portion in the longitudinal direction of the potential regulation member 8, the potential regulation member 8 is pressed against the inner peripheral surface of the intermediate transfer belt 6 by pressing springs 87 (FIG. 3B) each including a compression coil spring that is a biasing member serving as biasing means. In the pressing, it is desirable that the contact portion of the potential regulation member 8 that is in contact with the inner peripheral surface of the intermediate transfer belt 6 preferably crosses the straight line L toward a side with the photosensitive drum 11. With this configuration, even in a case where a corrugation or a vibration occurs in the intermediate transfer belt 6 during the image forming operation (during the running of the intermediate transfer belt 6), the potential regulation member 8 is more stably in contact with the intermediate transfer belt 6. In the present exemplary embodiment, the pressing force of the pressing springs 87 is set (adjusted) so that the upstream end A and the downstream end B of the contact surface 83 that is the contact portion of the potential regulation member 8 and is in contact with the inner peripheral surface of the intermediate transfer belt 6 are caused to enter the side with the photosensitive drum 11 with respect to the straight line L by about 0.5 mm. As described above, since the contact surface 83 of the potential regulation member 8 is caused to cross the straight line L toward the side with the photosensitive drum 11, even in a case where a corrugation or a vibration occurs in the intermediate transfer belt 6 during the image forming operation (during the running of the intermediate transfer belt 6), the potential regulation member 8 is brought into surface contact with the intermediate transfer belt 6 more stably. While the present disclosure is not limited to this, it is desirable that the amount of entry of the contact surface 83 of the potential regulation member 8 to the straight line L is preferably about 0.3 mm to 5 mm. Typically, the amount of entry is about 0.5 mm to 3 mm. If the amount of entry is too small, there may be difficulty in stably bringing the potential regulation member 8 into contact with the intermediate transfer belt 6. If the amount of entry is too great, there may be difficulty in stably conveying the intermediate transfer belt 6.

In the cross section approximately orthogonal to the rotational axis direction of each photosensitive drum 11, a straight line passing through the upstream end A and the downstream end B of the contact surface 83 is defined as a straight line M. It is desirable to prevent the straight line M from intersecting a line segment CD in the straight line L. With this configuration, in a case where the contact surface 83 of the potential regulation member 8 is a planar surface, the intermediate transfer belt 6 and the potential regulation member 8 are more reliably in surface contact with each other. If the straight line M intersects the line segment CD in the straight line L, only either of the end portion with the upstream end A of the potential regulation member 8 and the end portion with the downstream end B of the potential regulation member 8 may be in contact with the inner peripheral surface of the intermediate transfer belt 6. In this case, there may be difficulty in increasing the effect of preventing or reducing occurrence of discharge by the surface contact.

Although in FIG. 6, the potential regulation member 8 is disposed in such a manner that the straight lines M and L are almost parallel to each other, the potential regulation member 8 may be disposed in such a manner that the straight line M is inclined with respect to the straight line L in a range where the straight line M does not intersect the line segment CD in the straight line L. For example, the straight line M is inclined with respect to the straight line L in such a manner that the portion with the upstream end A is disposed closer to the straight line L than the portion with the downstream end B, which decreases curvature that occurs in the intermediate transfer belt 6 due to the crawling of the intermediate transfer belt 6 near the upstream end A. Thus, this is advantageous for reducing the possibility that a scratch occurs on the inner peripheral surface of the intermediate transfer belt 6 by sliding friction with the potential regulation member 8.

The contact portion of the potential regulation member 8 that is in contact with the inner peripheral surface of the intermediate transfer belt 6 is not limited to a planar surface. For example, the potential regulation member 8 may include a curved plate curved in a protruding manner toward the side with the photosensitive drum 11 in the cross section approximately orthogonal to the rotational axis direction of the photosensitive drum 11, and the contact portion of the potential regulation member 8 that is in contact with the inner peripheral surface of the intermediate transfer belt 6 may be a curved surface protruding toward the side with the photosensitive drum 11. With a curved surface form as described above in the contact portion (the contact surface) of the potential regulation member 8 that is in contact with the inner peripheral surface of the intermediate transfer belt 6, stress when the potential regulation member 8 is in sliding friction with the intermediate transfer belt 6 is reduced. The potential regulation member 8 in a roller-like form may be used to provide a curved surface in the contact portion of the potential regulation member 8 that is in contact with the inner peripheral surface of the intermediate transfer belt 6.

5. Issue

Figure 16A:
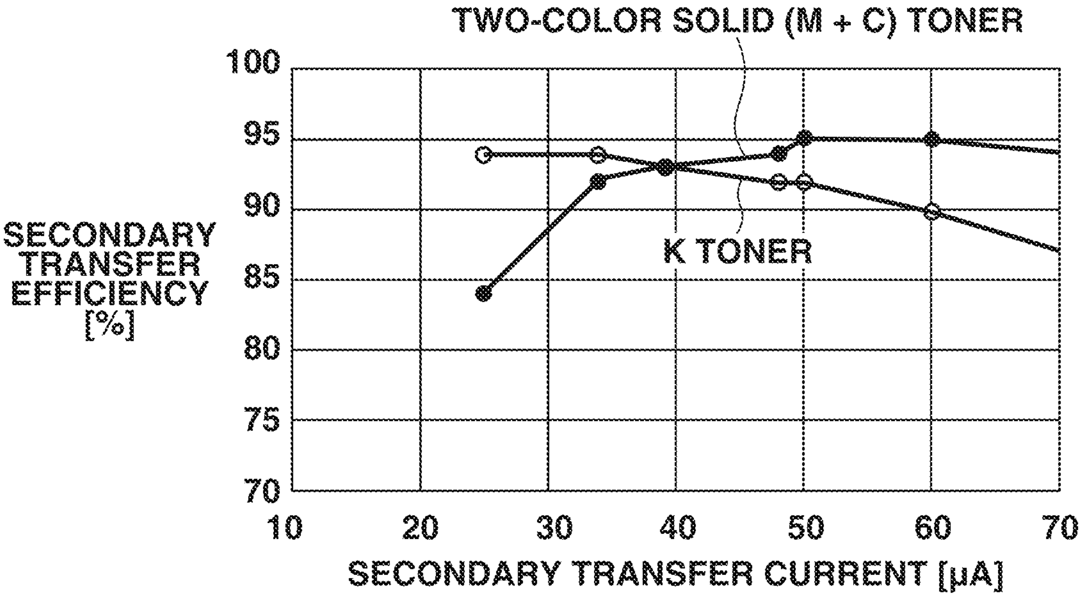
FIGS. 16A and 16B are graphs illustrating a relationship between a secondary transfer current and a secondary transfer efficiency.
Figure 16B:
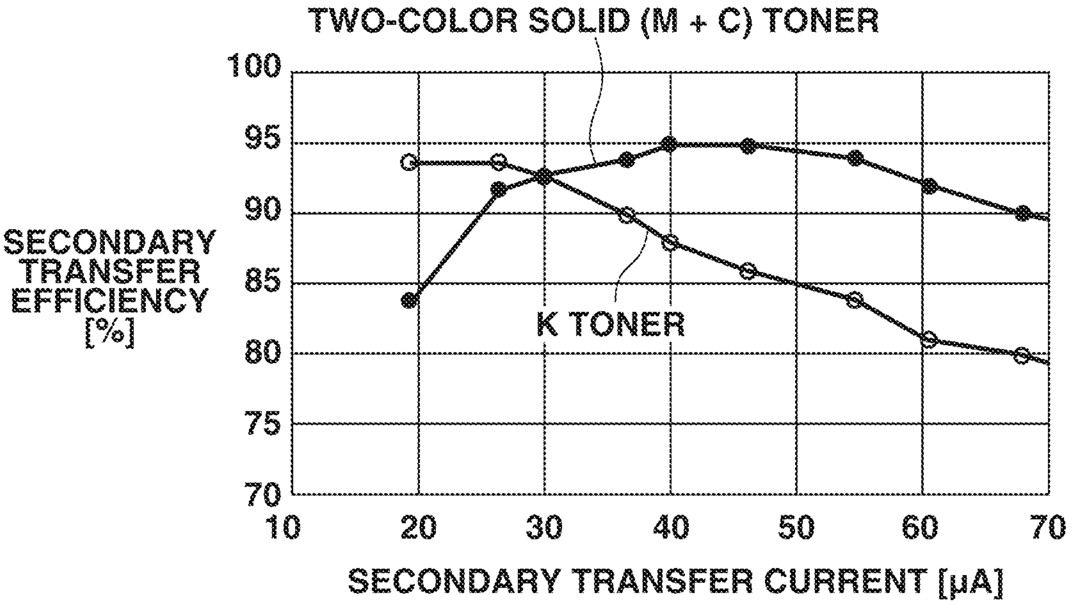

FIGS. 16A and 16B are graphs illustrating the relationship between the secondary transfer current and the secondary transfer efficiency of each of a two-color solid (magenta (M)+cyan (C)) toner image and a black (K) toner image. FIG. 16A illustrates the relationship in a case where the potential regulation members 8 are not disposed for all the image forming units **1*h*0. FIG. 16B illustrates the relationship in a case where the same potential regulation bias is applied to the potential regulation members 8 of all the image forming units 10**. The method for measuring the secondary transfer efficiency will be described below.

As illustrated in FIGS. 16A and 16B, the secondary transfer current with which the secondary transfer efficiency of the two-color solid (M+C) toner image is 95% is smaller and the strength of the secondary transfer electric field can be made smaller in the case with the potential regulation members 8 than in the case without the potential regulation members 8. Thus, with the potential regulation members 8, the secondary transfer efficiency of a chromatic color toner image such as a two-color solid (M+C) toner image can be obtained with a relatively low strength of the secondary transfer electric field, and at the same time, the graininess of the toner image and the secondary transfer property in transferring the toner image to embossed paper can be improved.

As illustrated in FIGS. 16A and 16B, however, it has been found that there can be a case in which the secondary transfer efficiency of the black (K) toner is decreased in the case with the potential regulation members 8. This may be due to the following reasons.

Figure 17:
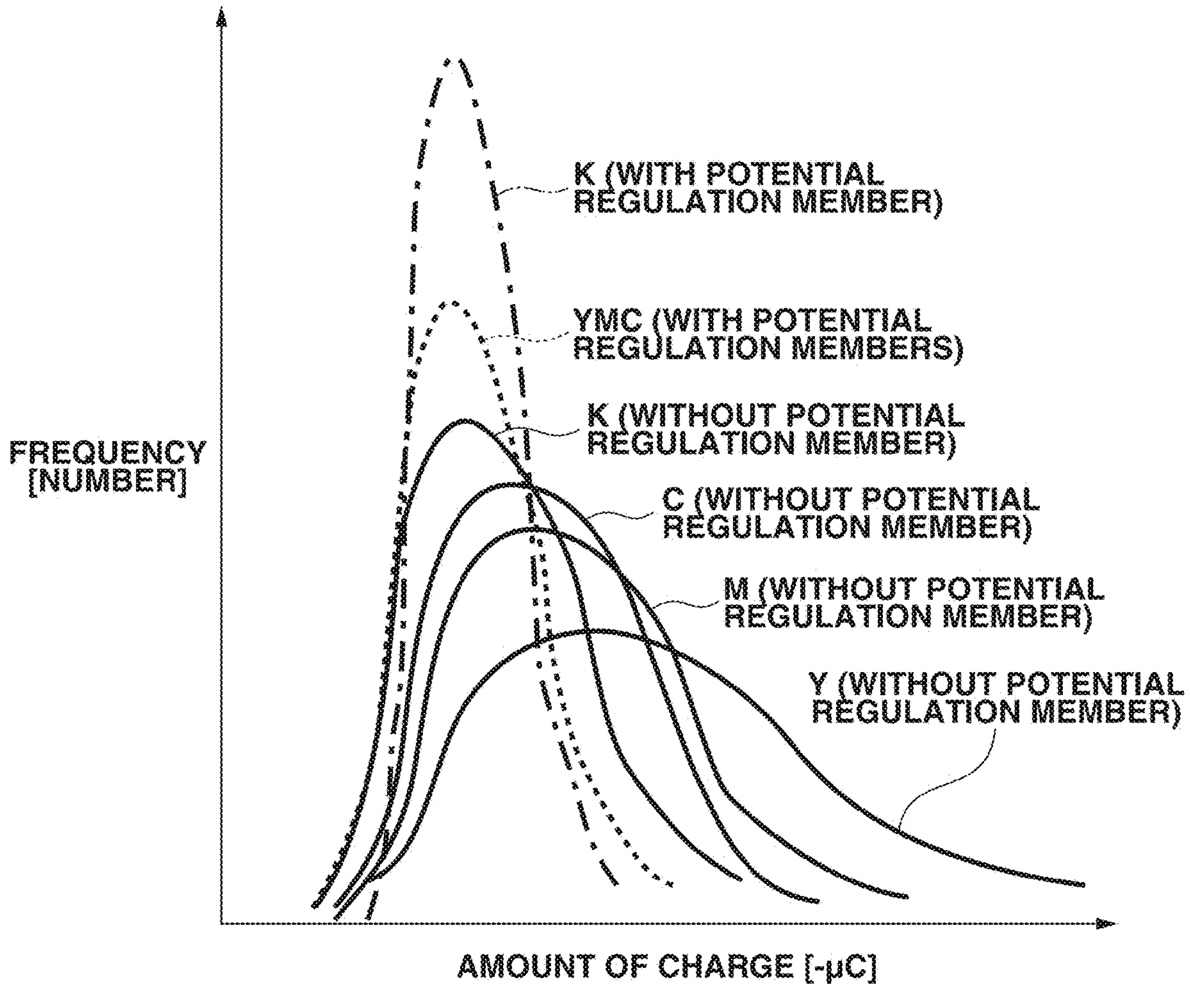
FIG. 17 is a graph schematically illustrating the distributions of the charge amounts of toner.

As the first reason, the image forming unit **10*k* for black is disposed downstream of the image forming units 10*y*, 10*m*, and 10*c* for chromatic colors (yellow, magenta, and cyan in the present exemplary embodiment). That is, a toner image primarily transferred onto the intermediate transfer belt 6 in a primary transfer portion N1 on the upstream side receives discharge at a portion downstream of the primary transfer portion N1 and further receives discharge at a portion downstream of another primary transfer portion N1 downstream of the primary transfer portion N1. FIG. 17 is a graph schematically illustrating the distributions of the charge amounts of toner on the intermediate transfer belt 6 after passing through the primary transfer portion N1*k* disposed in the furthest downstream position (before reaching the secondary transfer portion N2). Solid lines in FIG. 17 schematically indicate the distributions of the charge amounts of yellow, magenta, cyan, and black toner on the intermediate transfer belt 6 after passing through the primary transfer portion N1*k* disposed in the furthest downstream position (before reaching the secondary transfer portion N2) in the case without the potential regulation members 8. In the case without the potential regulation members 8, the yellow, magenta, cyan, and black toner on the intermediate transfer belt 6 receive the above-described discharge, and the distributions of the charge amounts of the toner broaden while the average values of the charge amounts of the toner increase. In contrast, with the potential regulation members 8, the distributions of the charge amounts of the toner on the intermediate transfer belt 6 are brought close to the distributions of the charge amounts of the toner on the photosensitive drums 11** (bring the distributions of the charge amounts of the toner sharper while decreasing the average values of the charge amounts of the toner).

However, in a case where the same potential regulation bias is applied to the potential regulation members **8*y*, 8*m*, and 8*c* for yellow, magenta, and cyan, respectively, on the upstream side and the potential regulation member 8*k* for black on the downstream side, the effect of preventing an increase in the charge amount is too strong for the black toner. A dashed line in FIG. 17 schematically indicates the distributions of the charge amounts of yellow, magenta, and cyan toner on the intermediate transfer belt 6 after passing through the primary transfer portion N1*k* disposed in the furthest downstream position (before reaching the secondary transfer portion N2) in the case with the potential regulation members 8. A one-dot chain line in FIG. 17 schematically indicates the distribution of the charge amount of black toner on the intermediate transfer belt 6 after passing through the primary transfer portion N1*k* disposed in the furthest downstream position (before reaching the secondary transfer portion N2) in the case with the potential regulation members 8. The black toner on the intermediate transfer belt 6 receives discharge only at the portion downstream of the primary transfer portion N1*k* for black, and consequently, the extent of an increase in the charge amount (the broadening of the distribution of the charge amount and an increase in the average value of the charge amount) of the black toner due to the discharge is small. Thus, application of the same potential regulation bias as the potential regulation biases applied to the potential regulation members 8*y*, 8*m*, and 8*c* for yellow, magenta, and cyan, respectively, to the potential regulation member 8*k* for black excessively prevents an increase in the charge amount of the black toner. Consequently, as illustrated in FIG. 16**B, in a case of the setting of the secondary transfer current with which the secondary transfer efficiency of a chromatic color toner image such as a two-color solid (M+C) toner image is 95%, the strength of the secondary transfer electric field is too strong for a black toner image. This may result in a reverse of the charge polarity of the toner, and the secondary transfer efficiency decreases.

As the second reason, the components of toner of chromatic colors (yellow, magenta, and cyan in the present exemplary embodiment) and black toner are different from each other. Generally, because the content (weight percent) of a conductive component such as carbon black in black toner is greater than those of toner of colors other than black, such as toner of chromatic colors (including transparent toner and white toner), the charge amount of the black toner is less likely to increase. Thus, application of the same potential regulation bias as the potential regulation biases applied to the potential regulation members **8*y*, 8*m*, and 8*c* for yellow, magenta, and cyan, respectively, to the potential regulation member 8*k*** for black excessively prevents an increase in the charge amount of the black toner, similarly to the above, and this may lead to a decrease in the secondary transfer efficiency. As described above, as the reason why the charge amount of the black toner excessively decreases compared to the color toner, the black toner contains carbon black pigment.

In view of the above-described issues, the objectives to be achieved are obtaining the secondary transfer efficiency of a chromatic color toner image, such as a two-color solid toner image, with a relatively low strength of the secondary transfer electric field and at the same time preventing a decrease in the secondary transfer efficiency of a black toner image. To put it another way, in a configuration with the potential regulation members 8, it is demanded to obtain excellent secondary transfer properties of both toner primarily transferred to the intermediate transfer belt 6 on the upstream side and toner primarily transferred to the intermediate transfer belt 6 on the downstream side. To put it yet another way, in a configuration with the potential regulation members 8, it is demanded to obtain excellent secondary transfer properties of both toner of colors other than black and black toner.

6. Potential Regulation Biases

6-1. Determination of Potential Regulation Biases

Figure 7:
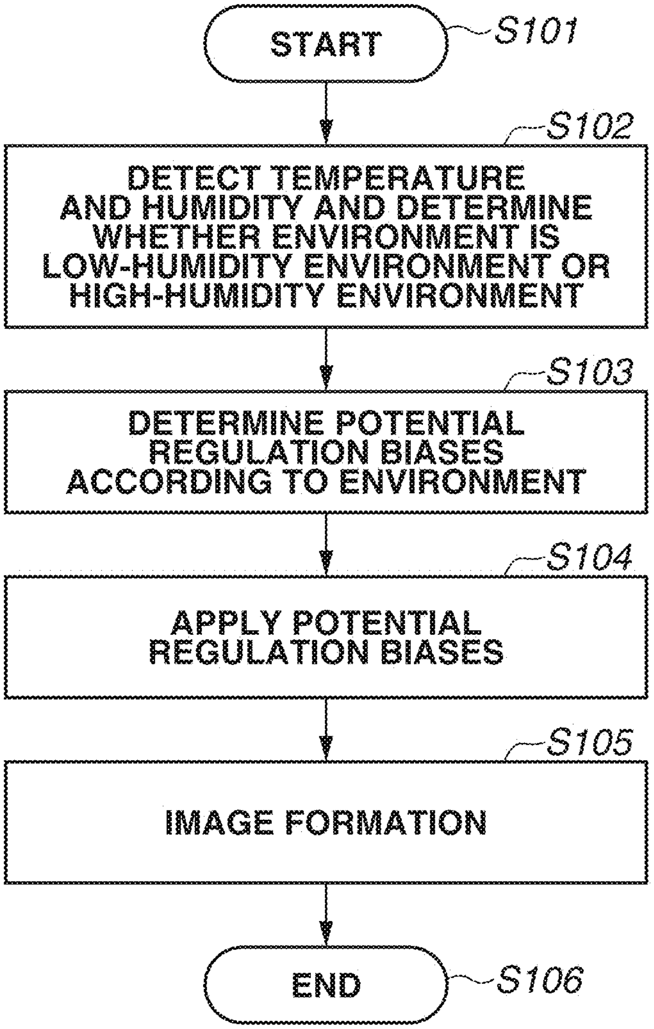
FIG. 7 is a flowchart illustrating an outline of a procedure of a job.

A method for determining the potential regulation biases according to the present exemplary embodiment is described. A description will be given of a case in which the image forming apparatus 1 performs image formation in the full-color mode. FIG. 7 is a flowchart illustrating the outline of the procedure of a job including control for determining the potential regulation biases according to the present exemplary embodiment.

In the present exemplary embodiment, as described above, the potential regulation power supplies 80 (80*y*, 80*m*, 80*c*, and 80*k*) are independently disposed in the potential regulation members 8 (8*y*, 8*m*, 8*c*, and 8*k*). In the present exemplary embodiment, the potential regulation biases to be applied from the potential regulation power supplies 80 (80*y*, 80*m*, 80*c*, and 80*k*) to the potential regulation members 8 (8*y*, 8*m*, 8*c*, and 8*k*) can be individually controlled. In the present exemplary embodiment, the potential regulation biases to be applied to the potential regulation members 8 (8*y*, 8*m*, 8*c*, and 8*k*) in an image formation are subjected to constant voltage control at target voltages set in advance. In the present exemplary embodiment, the target voltages for the potential regulation biases to be applied to the potential regulation members 8 (8*y*, 8*m*, 8*c*, and 8*k*) are set in advance according to the environment (the temperature and the humidity). In the present exemplary embodiment, the control section 3 performs control in such a manner that the potential regulation bias to be applied to the potential regulation member 8*k* for black on the downstream side is set to be smaller than the potential regulation biases to be applied to the potential regulation members 8*y*, 8*m*, and 8*c* for yellow, magenta, and cyan, respectively, on the upstream side.

First, in step S101, the control section 3 starts the job. In step S102, the control section 3 acquires the result of detecting the temperature by the temperature sensor 71 and the result of detecting the humidity by the humidity sensor 72 and determines whether the environment is a low-humidity environment or a high-humidity environment. In the present exemplary embodiment, the low-humidity environment is an environment where the temperature is 23° C. or lower and the humidity (the relative humidity) is 55% or lower. On the other hand, in the present exemplary embodiment, the high-humidity environment is an environment where the temperature is higher than 23° C. and the humidity is higher than 55%.

In step S103, according to the environment determined in step S102, the control section 3 determines target voltages for the potential regulation biases to be applied to the potential regulation members 8*y*, 8*m*, 8*c*, and 8*k* for yellow, magenta, cyan, and black, respectively. In the present exemplary embodiment, the control section 3 reads target voltages for the potential regulation biases corresponding to the environment from table data as illustrated in table 1 set in advance and stored in the ROM 32 and determines the target voltages. Table 1 is an example of information indicating the relationship between the environment and the potential regulation bias with respect to each of the potential regulation members 8 (8*y*, 8*m*, 8*c*, and 8*k*).

TABLE 1

| | Y | M | C | K |
|---|---|---|---|---|
| Low humidity | −3000 V | −3000 V | −3000 V | −1500 V |
| High humidity | −3000 V | −3000 V | −3000 V | OFF (0 V) |

In the present exemplary embodiment, in a case where it is determined in step S102 that the environment is the low-humidity environment, then as illustrated in table 1, the control section 3 determines that a potential regulation bias of −3000 V is to be applied to the potential regulation members 8*y*, 8*m*, and 8*c* for yellow, magenta, and cyan, respectively. In this case, as illustrated in table 1, the control section 3 determines that a potential regulation bias of −1500 V, which is smaller than the potential regulation biases to be applied to the potential regulation members 8*y*, 8*m*, and 8*c* for yellow, magenta, and cyan, respectively, is to be applied to the potential regulation member 8*k* for black.

In the present exemplary embodiment, in a case where it is determined in step S102 that the environment is the high-humidity environment, then as illustrated in table 1, the control section 3 determines that a potential regulation bias of −3000 V is to be applied to the potential regulation members 8*y*, 8*m*, and 8*c* for yellow, magenta, and cyan, respectively. In this case, as illustrated in table 1, the control section 3 determines that the potential regulation power supply 80*k* for black is to be turned off (the potential regulation member 8*k* is to be electrically grounded) or a potential regulation bias of approximately 0 V is to be applied to the potential regulation member 8*k* for black (the potential regulation bias to be applied to the potential regulation member 8*k* for black is to be subjected to constant voltage control at a target voltage of approximately 0 V).

That is, in the present exemplary embodiment, in each environment, the potential regulation bias to be applied to the potential regulation member 8*k* for black on the downstream side is smaller than the potential regulation biases applied to the potential regulation members 8*y*, 8*m*, and 8*c* for yellow, magenta, and cyan, respectively, on the upstream side.

Then, in step S104, the control section 3 applies the potential regulation biases determined in step S103 to the potential regulation members 8 (8*y*, 8*m*, 8*c*, and 8*k*). In step S105, the control section 3 performs image formation. In step S106, the control section 3 ends the job.

6-2. Effects Under Low-Humidity Environment

A description will be given of the effects of the settings of the potential regulation biases according to the present exemplary embodiment under the low-humidity environment.

Figure 8A:
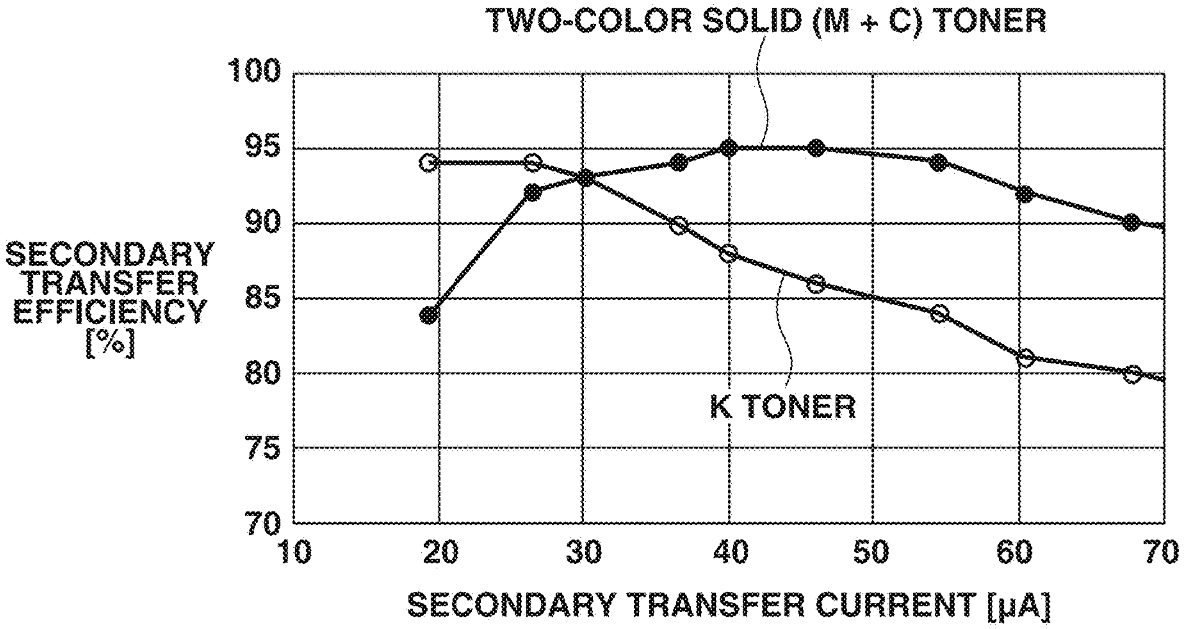
FIGS. 8A and 8B are graphs illustrating effects of a first exemplary embodiment.
Figure 8B:
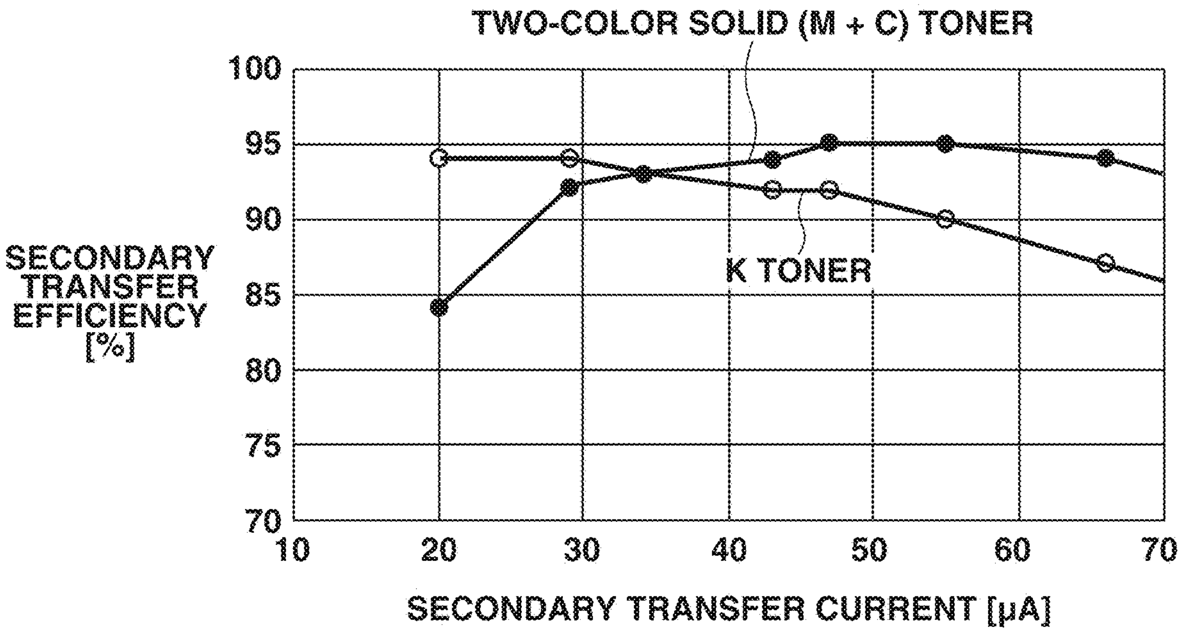

FIGS. 8A and 8B are graphs illustrating the relationship between the secondary transfer current and the secondary transfer efficiency of each of a two-color solid (M+C) toner image and a black (black monochromatic solid) (K) toner image under the low-humidity environment. As a comparative example, FIG. 8A illustrates the relationship in a case where the same potential regulation bias of −3000 V is applied to the potential regulation members 8*y*, 8*m*, 8*c*, and 8*k* for yellow, magenta, cyan, and black, respectively. FIG. 8B illustrates the relationship in the case of the present exemplary embodiment, i.e., in a case where a potential regulation bias of −3000 V is applied to the potential regulation members 8*y*, 8*m*, and 8*c* for yellow, magenta, and cyan, respectively, and a potential regulation bias of −1500 V is applied to the potential regulation member 8*k* for black.

The weight of toner per unit area of the two-color solid (M+C) toner image in the results illustrated in FIGS. 8A and 8B is approximately 0.9 $mg/cm^2$ to 1.2 $mg/cm^2$. The weight of toner per unit area of the black (K) toner image in the results illustrated in FIGS. 8A and 8B is approximately 0.45 $mg/cm^2$ to 0.65 $mg/cm^2$.

The secondary transfer efficiency was calculated using the following formula after measuring the following A, B, and C:

$$\text{Secondary transfer efficiency} = \{(A - C)/(A + B - 2 \times C)\} \times 100(\%),$$

where A represents a value obtained by applying a transparent tape (PET25(A)MF11/3L manufactured by LINTEC Corporation) onto a toner image secondarily transferred to paper (the recording material S) and measuring the density of the transparent tape using the 500 Series densitometer manufactured by X-Rite, Incorporated, B represents a value obtained by peeling off toner remaining on the intermediate transfer belt 6 without being secondarily transferred to the paper using the adhesive layer of the transparent tape, applying the transparent tape onto unused paper of the same brand as the paper used in the secondary transfer, and measuring the density of the transparent tape using the densitometer, and C represents a value obtained by applying the transparent tape as it is onto unused paper similar to the above and measuring the density of the transparent tape using the densitometer. The paper used to measure the secondary transfer efficiency is GF-C081 manufactured by Oji Paper Co., Ltd.

As illustrated in FIGS. 8A and 8B, the secondary transfer efficiency of the black (K) toner image with the secondary transfer current with which the secondary transfer efficiency of the two-color solid (M+C) toner image is 95% is higher in the present exemplary embodiment than in the comparative example. In the comparative example, the secondary transfer efficiency of the black (K) toner image with the secondary transfer current is approximately less than 90%, whereas in the present exemplary embodiment, the secondary transfer efficiency of the black (K) toner image with the secondary transfer current exceeds 90%. As described above, in the present exemplary embodiment, the secondary transfer efficiency of the black (K) toner image improves compared to the comparative example.

In a case where the secondary transfer efficiency of the black toner image tends to decrease with an increase in the secondary transfer current as illustrated in FIGS. 8A and 8B, the smaller the charge amount of the toner is, the more remarkable the tendency is. This is because the smaller the charge amount of the toner is, the smaller the proportion of the electric field used for the secondary transfer in the secondary transfer electric field is. Then, an extra electric field contributes to a reversal of the charge polarity of the toner, and the decrease in the secondary transfer efficiency becomes more remarkable.

Figure 9A:
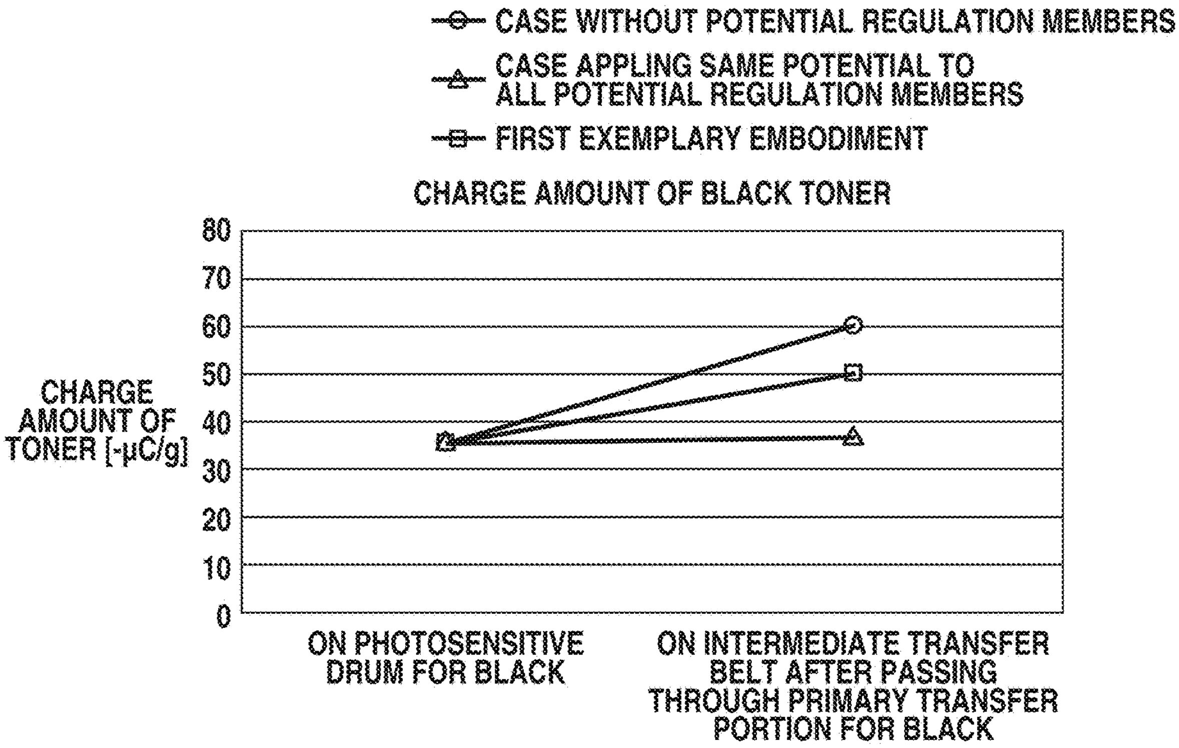
FIGS. 9A and 9B are graphs illustrating the effects of the first exemplary embodiment.
Figure 9B:
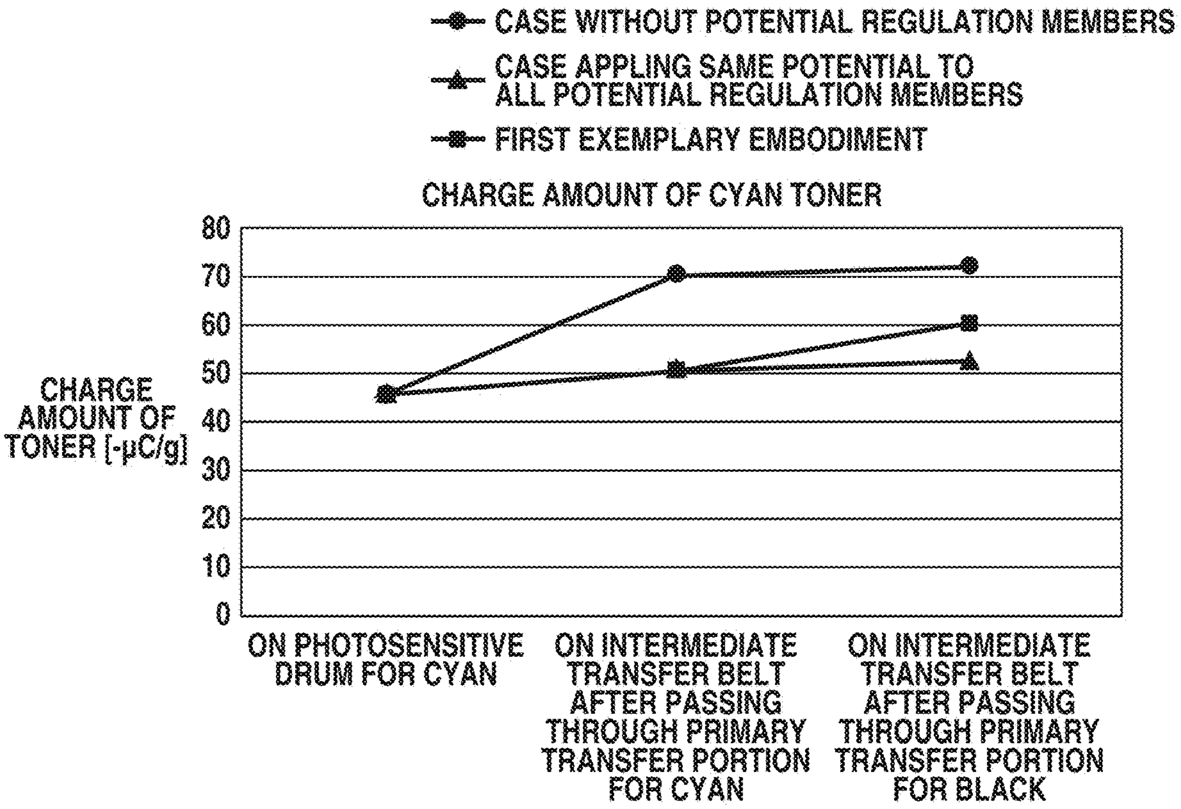

FIGS. 9A and 9B are graphs illustrating the charge amount of toner on the photosensitive drum 11 and the charge amount of the toner on the intermediate transfer belt 6 under the low-humidity environment. FIG. 9A illustrates the charge amount of black toner on the photosensitive drum 11*k* for black and the charge amount of the black toner on the intermediate transfer belt 6 after passing through the primary transfer portion N1*k* for black (before reaching the secondary transfer portion N2). FIG. 9B illustrates the charge amount of cyan toner on the photosensitive drum 11*c* for cyan, the charge amount of the cyan toner on the intermediate transfer belt 6 after passing through the primary transfer portion N1*c* for cyan (before reaching the primary transfer portion N1*k* for black), and the charge amount of the cyan toner on the intermediate transfer belt 6 after passing through the primary transfer portion N1*k* for black (before reaching the secondary transfer portion N2). Each of FIGS. 9A and 9B illustrates the results obtained in a case where the potential regulation members 8 are not disposed for all the image forming units 10, a case where the same potential regulation bias of −3000 V is applied to all the potential regulation members 8*y*, 8*m*, 8*c*, and 8*k*, and the case of the present exemplary embodiment.

The charge amount of toner was calculated by measuring charges per unit weight using a Coulombmeter by a general suction method in this field. This method calculates the charge amount [μC/g] by measuring the weight [g] of suctioned toner and the amount of charge [μC] so that the average charge amount of toner is obtained.

As illustrated in FIG. 9A, in a case where the same potential regulation bias (−3000 V) as those of the potential regulation members 8*y*, 8*m*, and 8*c* for yellow, magenta, and cyan, respectively, is also applied to the potential regulation member 8*k* for black, the charge amount of the black toner on the intermediate transfer belt 6 does not increase, and the charge amount of the black toner remains as low as the charge amount of the black toner on the photosensitive drum 11*k*. On the other hand, in a case where a potential regulation bias (−1500 V) smaller than the potential regulation biases (−3000 V) applied to the potential regulation members 8*y*, 8*m*, and 8*c* for yellow, magenta, and cyan, respectively, is applied to the potential regulation member 8*k* for black as in the present exemplary embodiment, the charge amount of the black toner on the intermediate transfer belt 6 increases, although not so much as the case where the potential regulation members 8 are not used. As a result, as described with reference to FIGS. 8A and 8B, in the present exemplary embodiment, the secondary transfer efficiency of a black toner image improves compared to the comparative example.

As illustrated in FIG. 9B, in the present exemplary embodiment, the charge amount of the cyan toner (toner of a chromatic color) on the intermediate transfer belt 6 after passing through the primary transfer portion N1*k* for black increases in comparison to the case where the same potential regulation bias (−3000 V) is applied to the potential regulation members 8*y*, 8*m*, 8*c*, and 8*k* for yellow, magenta, cyan, and black, respectively, because the potential regulation bias (−1500 V) applied to the potential regulation member 8*k* for black is low. However, the charge amount of the cyan toner on the intermediate transfer belt 6 after passing through the primary transfer portion N1*k* for black is decreased in comparison to the case without the potential regulation members 8. The same applies to yellow toner and magenta toner. As a result, as described with reference to FIGS. 8A and 8B, the secondary transfer efficiency of a chromatic color toner image such as a two-color (M+C) solid toner image can be obtained with a relatively low strength of the secondary transfer electric field.

6-3. Effects Under High-Humidity Environment

A description will be given of the effects of the settings of the potential regulation biases according to the present exemplary embodiment under the high-humidity environment.

Figure 10:
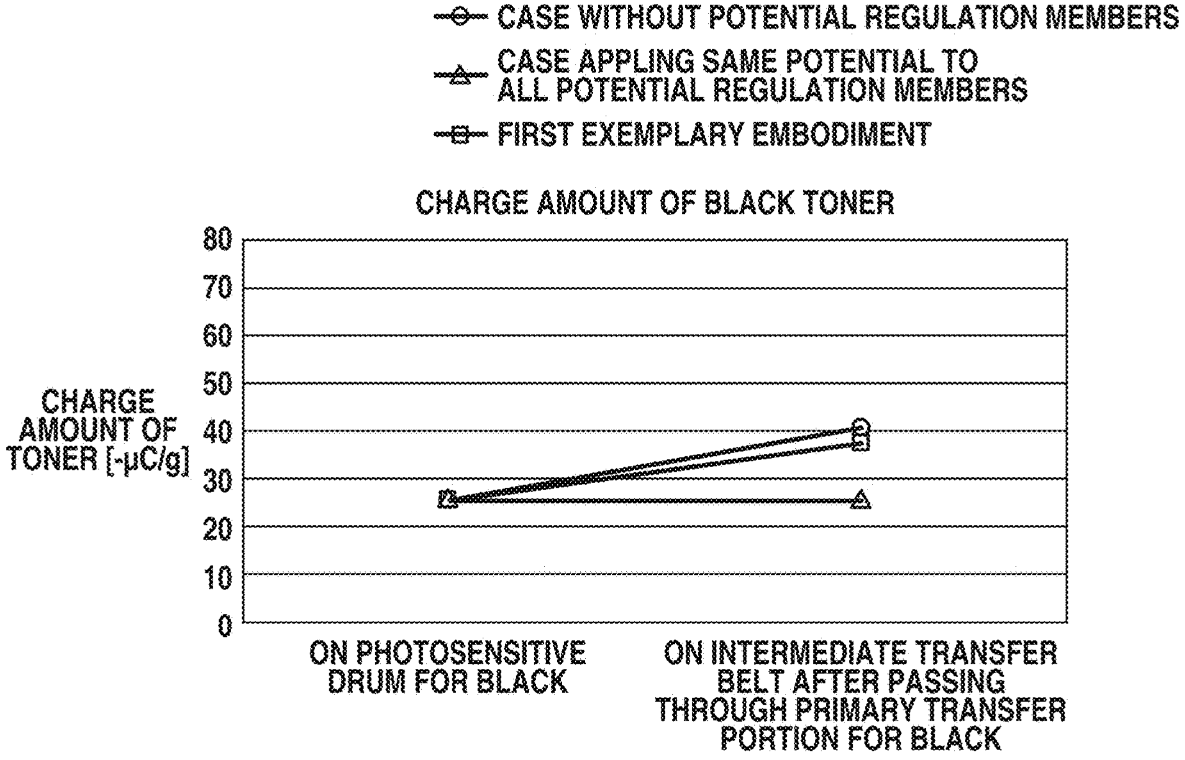
FIG. 10 is a graph illustrating the effects of the first exemplary embodiment.

FIG. 10 is a graph illustrating the charge amount of the black toner on the photosensitive drum 11*k* for black and the charge amount of the black toner on the intermediate transfer belt 6 after passing through the primary transfer portion N1*k* for black (before reaching the secondary transfer portion N2) under the high-humidity environment. FIG. 10 illustrates the results obtained in a case where the potential regulation members 8 are not provided for all the image forming units 10, a case where the same potential regulation bias of −3000 V is applied to all the potential regulation members 8$y$, 8$m$, 8$c$, and 8$k$, and the case of the present exemplary embodiment.

As illustrated in FIG. 10, under the high-humidity environment, the charge amount of the black toner on the photosensitive drum 11$k$ for black is smaller than the case under the low-humidity environment (FIG. 9A). Thus, in the present exemplary embodiment, the potential regulation bias to be applied to the potential regulation member 8$k$ for black under the high-humidity environment is decreased in comparison to the potential regulation bias to be applied to the potential regulation member 8$k$ for black under the low-humidity environment. In the present exemplary embodiment, under the high-humidity environment, the potential regulation power supply 80$k$ for black is turned off or a potential regulation bias of approximately 0 V is applied to the potential regulation member 8$k$ for black. This prevents an excessive decrease in the charge amount of the black toner on the intermediate transfer belt 6 after passing through the primary transfer portion N1$k$ for black under the high-humidity environment. As a result, under the high-humidity environment, a decrease in the secondary transfer efficiency of a black toner image is prevented.

In the present exemplary embodiment, the differences in the charge amounts of the yellow, magenta, and cyan toner on the photosensitive drums 11 are sufficiently small between the low-humidity environment and the high-humidity environment. Thus, in the present exemplary embodiment, as illustrated in table 1, the potential regulation biases to be applied to the potential regulation members 8$y$, 8$m$, and 8$c$ for yellow, magenta, and cyan, respectively, are set to be the same between the low-humidity environment and the high-humidity environment. The present disclosure, however, is not limited to this. For a reason similar to that described regarding the black toner, the potential regulation biases to be applied to the potential regulation members 8$y$, 8$m$, and 8$c$ for yellow, magenta, and cyan, respectively, may be differentiated between the low-humidity environment and the high-humidity environment. Table 2 illustrates examples of the settings of the potential regulation biases in a case where the charge amounts of the yellow, magenta, cyan, and black toner on the photosensitive drums 11 decrease under the high-humidity environment in comparison to the low-humidity environment. Similarly, according to the differences in the charge amounts of the toner on the photosensitive drums 11 between the low-humidity environment and the high-humidity environment, at least one of the potential regulation biases to be applied to the potential regulation members 8$y$, 8$m$, 8$c$, and 8$k$ for yellow, magenta, cyan, and black, respectively, can be differentiated between the low-humidity environment and the high-humidity environment. Here, under each environment, the potential regulation bias to be applied to the potential regulation member 8$k$ for black on the downstream side is set to be smaller than the potential regulation biases to be applied to the potential regulation members 8$y$, 8$m$, and 8$c$ for yellow, magenta, and cyan, respectively, on the upstream side.

TABLE 2

| | Y | M | C | K |
|---|---|---|---|---|
| Low humidity | −3000 V | −3000 V | −3000 V | −1500 V |
| High humidity | −2500 V | −2500 V | −2500 V | OFF (0 V) |

7. Effects

In the present exemplary embodiment, an image forming apparatus 1 includes first and second photosensitive members (e.g., a first photosensitive member 11$c$ and a second photosensitive member 11$k$) that can be charged to a predetermined polarity and bear toner images, an intermediate transfer belt 6 that is capable of a rotation movement, is in contact with the first photosensitive member 11$c$ and the second photosensitive member 11$k$ to form a first primary transfer portion N1$c$ and a second primary transfer portion N1$k$, and conveys the toner images primarily transferred from the first photosensitive member 11$c$ and the second photosensitive member 11$k$ in the first primary transfer portion N1$c$ and the second primary transfer portion N1$k$, respectively, to secondarily transfer the toner images to a recording material S in a secondary transfer portion N2, a first primary transfer member 15$c$ and a second primary transfer member 15$k$ that are in contact with an inner peripheral surface of the intermediate transfer belt 6, receive primary transfer biases having a polarity opposite to the predetermined polarity, and primarily transfer the toner images from the first photosensitive member 11$c$ and the second photosensitive member 11$k$, respectively, to the intermediate transfer belt 6, and a first electrode member 8$c$ and a second electrode member 8$k$ (potential regulation members) that are in contact with the inner peripheral surface of the intermediate transfer belt 6 in positions adjacent to and downstream of the first primary transfer portion N1$c$ and the second primary transfer portion N1$k$, respectively, in a moving direction of the intermediate transfer belt 6, application sections (potential regulation power supplies) 80$c$ and 80$k$ that apply biases having the same polarity as the predetermined polarity to the first electrode member 8$c$ and the second electrode member 8$k$, respectively, and a control section 3 capable of controlling the application sections 80$c$ and 80$k$, wherein the first photosensitive member 11$c$ is disposed upstream of the second photosensitive member 11$k$ in the moving direction of the intermediate transfer belt 6, and wherein the control section 3 controls the application sections 80$c$ and 80$k$ in such a manner that in a case where image formation to form an image on the recording material S by transferring the toner images formed on the first photosensitive member 11$c$ and the second photosensitive member 11$k$ to the recording material S is performed, an absolute value of a bias to be applied to the second electrode member 8$k$ is set to be smaller than an absolute value of a bias to be applied to the first electrode member 8$c$. In the present exemplary embodiment, the second photosensitive member 11$k$ is a member disposed furthest downstream in the moving direction of the intermediate transfer belt 6 among a plurality of photosensitive members included in the image forming apparatus 1. In the present exemplary embodiment, a toner image is formed using toner of a color other than black on the first photosensitive member 11$c$, and a toner image is formed using toner of black on the second photosensitive member 11$k$. In the present exemplary embodiment, the image forming apparatus 1 includes environment detection means (a temperature sensor 71 and a humidity sensor 72) that detect an environment, and the control section 3 controls the application sections 80$c$ and 80$k$ in such a manner that in a case where a humidity indicated by detection results of the environment detection means 71 and 72 is a second humidity higher than a first humidity, the absolute value of the bias to be applied to the second electrode member 8$k$ in image formation is set to be smaller than the absolute value of the bias to be applied to the second electrode member 8*k* in a case where a humidity indicated by the detection results is the first humidity. The control section 3 can control the application sections 80*c* and 80*k* in such a manner that in a case where a humidity indicated by the detection results of the environment detection means 71 and 72 is the second humidity higher than a first humidity, the absolute value of the bias to be applied to the first electrode member 8*c* in image formation is set to smaller than the absolute value of the bias to be applied to the first electrode member 8*c* in a case where a humidity indicated by the detection results is the first humidity.

As described above, according to the present exemplary embodiment, the secondary transfer efficiency of a chromatic color toner image such as a two-color solid (M+C) toner image is obtained with a relatively low strength of the secondary transfer electric field, and at the same time a decrease in the secondary transfer efficiency of a black toner image is prevented.

A description will be given of a second exemplary embodiment of the present disclosure. The basic configuration and operation of an image forming apparatus according to the present exemplary embodiment are similar to those of the image forming apparatus according to the first exemplary embodiment. Thus, in the image forming apparatus according to the present exemplary embodiment, a component having a function or configuration similar or corresponding to that of the image forming apparatus according to the first exemplary embodiment is designated by the same sign as that in the first exemplary embodiment, and is not described in detail.

8. Overview of Present Exemplary Embodiment

In the first exemplary embodiment, the potential regulation biases to be applied to the potential regulation members 8*y*, 8*m*, and 8*c* for yellow, magenta, and cyan, respectively, are set to be the same as each other, and the potential regulation bias to be applied to the potential regulation member 8*k* for black is set to be smaller than the potential regulation biases to be applied to the potential regulation members 8*y*, 8*m*, and 8*c* for yellow, magenta, and cyan. This prevents an increase in the difference between the charge amounts, on the intermediate transfer belt 6, of toner (toner of a chromatic color) that receives, in addition to discharge occurred downstream of a primary transfer portion N1 where the toner has been primarily transferred, discharge occurred downstream of a primary transfer portion N1 further on the downstream side and toner (black toner) that receives only discharge occurred downstream of a primary transfer portion N1 where the toner has been primarily transferred. With this configuration, the secondary transfer efficiency of a chromatic color toner image such as a two-color solid toner image is obtained with a relatively low strength of the secondary transfer electric field, and also a decrease in the secondary transfer efficiency of a black toner image is prevented.

As illustrated in FIG. 17, every time toner on the intermediate transfer belt 6 receives discharge occurred downstream of a primary transfer portion N1, the distribution of the charge amount of the toner tends to broaden while the average value of the charge amount of the toner tends to increase further. Thus, on closer look, if the potential regulation biases to be applied to the potential regulation members 8*y*, 8*m*, and 8*c* for yellow, magenta, and cyan, respectively, are set to be the same as each other, there are still differences between the charge amounts of the yellow, magenta, and cyan toner, each of which is different in the number of times of passing through the primary transfer portion N1, on the intermediate transfer belt 6.

Accordingly, in the present exemplary embodiment, the charge amounts of toner primarily transferred to the intermediate transfer belt 6 on the upstream side and toner primarily transferred to the intermediate transfer belt 6 on the downstream side are adjusted to be more uniform so that an excellent secondary transfer efficiency is more stably obtained.

9. Potential Regulation Biases 9-1. Determination of Potential Regulation Biases A description will be given of a method for determination of the potential regulation biases according to the present exemplary embodiment. A case in which the image forming apparatus 1 performs image formation in the full-color mode is described.

The procedure of a job including control for determination of the potential regulation biases according to the present exemplary embodiment is similar to that according to the first exemplary embodiment described with reference to the flowchart in FIG. 7. In the present exemplary embodiment, the control section 3 performs control in such a manner that the potential regulation bias to be applied to a potential regulation member is decreased with its downstream side position among the potential regulation members 8*y*, 8*m*, 8*c*, and 8*k* of the image forming units 10.

In step S103, similarly to the first exemplary embodiment, according to the environment determined in step S102, the control section 3 determines target voltages of the potential regulation biases to be applied to the potential regulation members 8*y*, 8*m*, 8*c*, and 8*k* for yellow, magenta, cyan, and black, respectively. In the present exemplary embodiment, the control section 3 reads target voltages of the potential regulation biases corresponding to the environment from table data as illustrated in table 3 set in advance and stored in the ROM 32, and determines the target voltages.

TABLE 3

| | Y | M | C | K |
|---|---|---|---|---|
| Low humidity | −3000 V | −2500 V | −2000 V | −1500 V |
| High humidity | −3000 V | −2500 V | −2000 V | OFF (0 V) |

In the present exemplary embodiment, in a case where it is determined in step S102 that the environment is the low-humidity environment, then as illustrated in table 3, the control section 3 determines that potential regulation biases of −3000 V, −2500 V, −2000 V, and −1500 V are to be applied to the potential regulation members 8*y*, 8*m*, 8*c*, and 8*k* for yellow, magenta, cyan, and black, respectively.

In the present exemplary embodiment, in a case where it is determined in step S102 that the environment is the high-humidity environment, then as illustrated in table 3, the control section 3 determines that potential regulation biases of −3000 V, −2500 V, and −2000 V are to be applied to the potential regulation members 8*y*, 8*m*, and 8*c* for yellow, magenta, and cyan, respectively. In this case, as illustrated in table 3, the control section 3 determines that the potential regulation power supply 80*k* for black is to be turned off (the potential regulation member 8*k* is to be electrically grounded) or a potential regulation bias of approximately 0 V is to be applied to the potential regulation member 8*k* for black (the potential regulation bias to be applied to the potential regulation member 8*k* for black is subjected to constant voltage control at a target voltage of approximately 0 V).

That is, in the present exemplary embodiment, in each environment, the potential regulation bias to be applied to a potential regulation member is decreased with its downstream side position among the potential regulation members 8*y*, 8*m*, 8*c*, and 8*k* of the image forming units 10.

9-2. Effects Under Low-Humidity Environment

A description will be given of the effects of the settings of the potential regulation biases according to the present exemplary embodiment under the low-humidity environment.

Figure 11A:
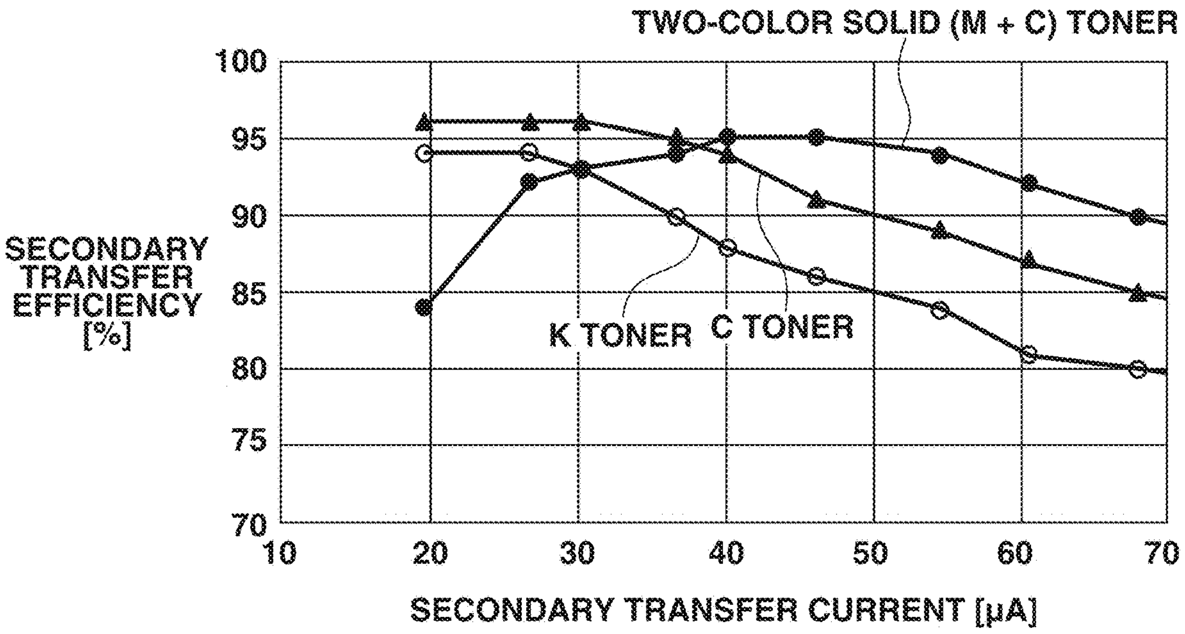
FIGS. 11A and 11B are graphs illustrating effects of a second exemplary embodiment.
Figure 11B:
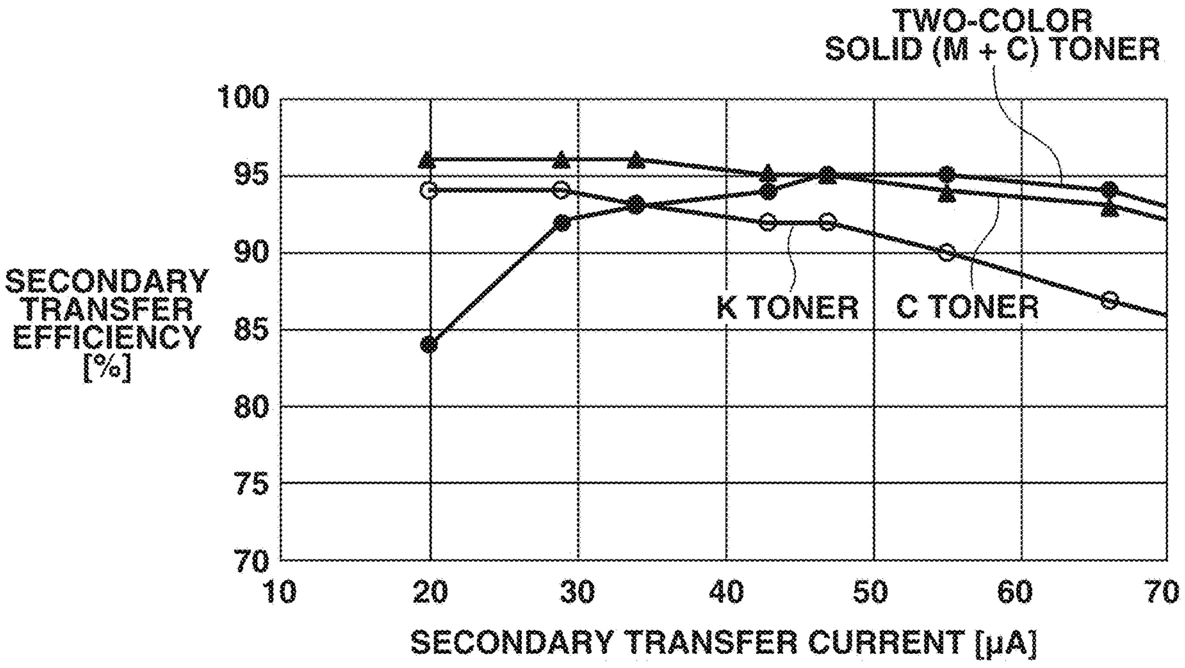

FIGS. 11A and 11B are graphs illustrating the relationship between the secondary transfer current and the secondary transfer efficiency of each of a two-color solid (M+C) toner image, a cyan (chromatic color monochromatic solid) (C) toner image, and a black (black monochromatic solid) (K) toner image under the low-humidity environment. As a comparative example, FIG. 11A illustrates the relationship in a case where the same potential regulation bias of −3000 V is applied to the potential regulation members 8*y*, 8*m*, 8*c*, and 8*k* for yellow, magenta, cyan, and black, respectively. FIG. 11B illustrates the relationship in the case of the present exemplary embodiment, i.e., in a case where potential regulation biases of −3000 V, −2500 V, −2000 V, and −1500 V are applied to the potential regulation members 8*y*, 8*m*, 8*c*, and 8*k* for yellow, magenta, cyan, and black, respectively.

The weight of toner per unit area of the two-color solid (M+C) toner image in the results illustrated in FIGS. 11A and 11B is approximately 0.9 $mg/cm^2$ to 1.2 $mg/cm^2$. The weight of toner per unit area of each of the cyan (C) toner image and the black (K) toner image in the results illustrated in FIGS. 11A and 11B is approximately 0.45 $mg/cm^2$ to 0.65 $mg/cm^2$. The method for measuring the secondary transfer efficiency is as described in the first exemplary embodiment.

As illustrated in FIGS. 11A and 11B, the secondary transfer efficiencies of the cyan (C) and black (K) toner images with the secondary transfer current with which the secondary transfer efficiency of the two-color solid (M+C) toner image is 95% are higher in the present exemplary embodiment than in the comparative example. In the comparative example, the secondary transfer efficiency of the cyan (C) toner image with the secondary transfer current is less than 95%, whereas in the present exemplary embodiment, the secondary transfer efficiency of the cyan (C) toner image with the secondary transfer current is approximately 95%. In the comparative example, the secondary transfer efficiency of the black (K) toner image with the secondary transfer current is less than 90%, whereas in the present exemplary embodiment, the secondary transfer efficiency of the black (K) toner image with the secondary transfer current exceeds 90%. As described above, in the present exemplary embodiment, the secondary transfer efficiencies of the cyan (C) and black (K) toner images improve in comparison to the comparative example.

In a case where the secondary transfer efficiencies of the cyan toner image and the black toner image tend to decrease with an increase in the secondary transfer current as illustrated in FIGS. 11A and 11B, then as described in the first exemplary embodiment, the smaller the charge amount of the toner is, the more remarkable the tendency is.

Figure 12:
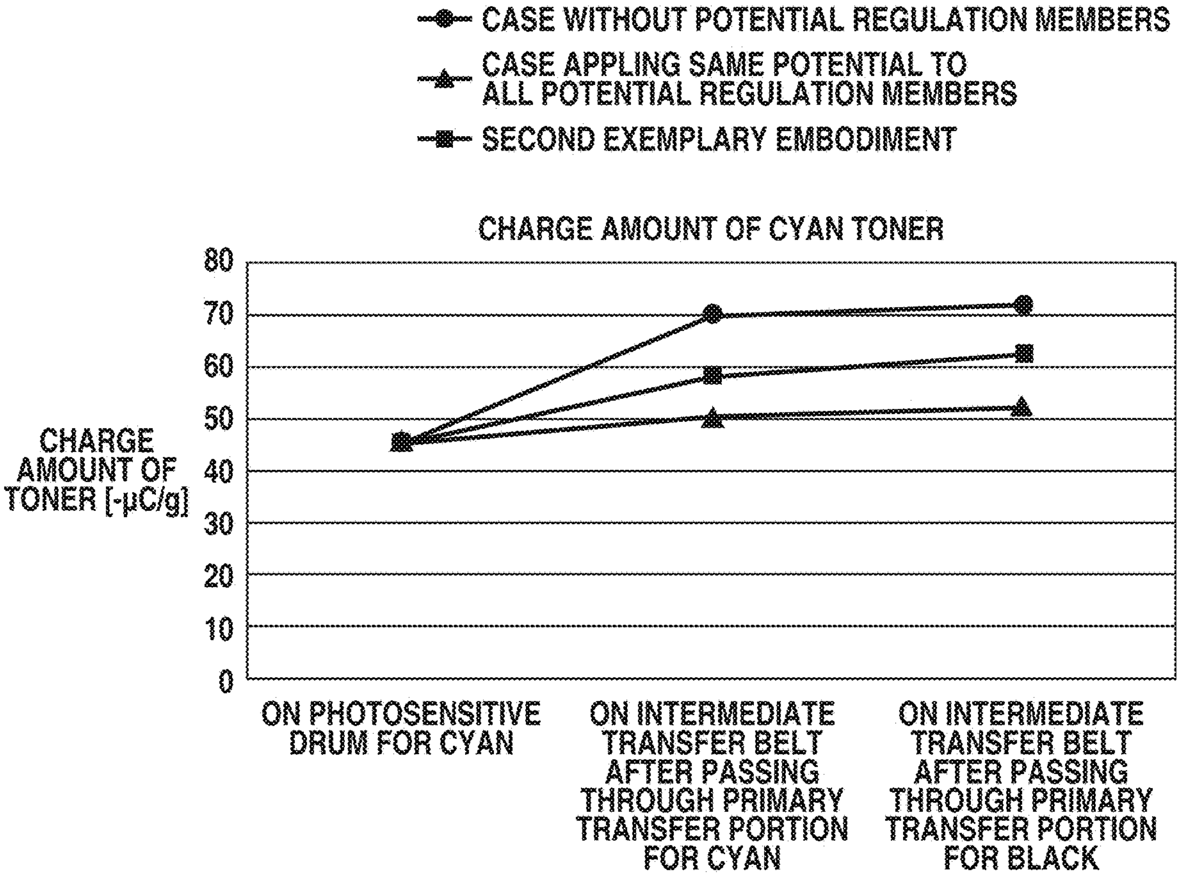
FIG. 12 is a graph illustrating the effects of the second exemplary embodiment.

FIG. 12 illustrates the charge amount of cyan toner on the photosensitive drum 11*c* for cyan, the charge amount of the cyan toner on the intermediate transfer belt 6 after passing through the primary transfer portion N1*c* for cyan (before reaching the primary transfer portion N1*k* for black), and the charge amount of the cyan toner on the intermediate transfer belt 6 after passing through the primary transfer portion N1*k* for black (before reaching the secondary transfer portion N2) under the low-humidity environment. FIG. 12 illustrates the result in a case where the potential regulation members 8 are not disposed for all the image forming units 10, a case where the same potential regulation bias of −3000 V is applied to all the potential regulation members 8*y*, 8*m*, 8*c*, and 8*k*, and the case of the present exemplary embodiment. The charge amount of black toner on the photosensitive drum 11*k* for black and the charge amount of the black toner on the intermediate transfer belt 6 after passing through the primary transfer portion N1*k* for black (before reaching the secondary transfer portion N2) under the low-humidity environment in the present exemplary embodiment are as illustrated in FIG. 9A.

As illustrated in FIG. 12, in a case where the same potential regulation bias (−3000 V) is applied to the potential regulation members 8*y*, 8*m*, 8*c*, and 8*k* for yellow, magenta, cyan, and black, respectively, the charge amount of the cyan toner on the intermediate transfer belt 6 does not increase, and the charge amount of the cyan toner remains as low as the charge amount of the cyan toner on the photosensitive drum 11*c*. On the other hand, in a case where potential regulation biases of −3000 V, −2500 V, −2000 V, and −1500 V are applied to the potential regulation members 8*y*, 8*m*, 8*c*, and 8*k* for yellow, magenta, cyan, and black, respectively, as in the present exemplary embodiment, the charge amount of the cyan toner on the intermediate transfer belt 6 increases, although not so much as the case with the potential regulation members 8. As a result, as described with reference to FIGS. 11A and 11B, in the present exemplary embodiment, the secondary transfer efficiency of a cyan toner image improves in comparison to the comparative example. The charge amount of the black toner does not excessively decrease, either, similarly to the first exemplary embodiment, since the potential regulation bias to be applied to the potential regulation member 8*k* for black is decreased compared to the potential regulation biases applied to the potential regulation members 8*y*, 8*m*, and 8*c* for yellow, magenta, and cyan, respectively. As a result, as described with reference to FIGS. 11A and 11B, in the present exemplary embodiment, the secondary transfer efficiency of the black toner improves in comparison to the comparative example.

As illustrated in FIG. 12, in the present exemplary embodiment, the charge amount of the cyan toner (toner of a chromatic color) on the intermediate transfer belt 6 after passing through the primary transfer portion N1*k* for black increases in comparison to the case where the same potential regulation bias (−3000 V) is applied to the potential regulation members 8*y*, 8*m*, 8*c*, and 8*k* for yellow, magenta, cyan, and black, respectively, since the potential regulation bias (−1500 V) applied to the potential regulation member 8*k* for black is low. However, the charge amount of the cyan toner on the intermediate transfer belt 6 after passing through the primary transfer portion N1*k* for black is decreased in comparison to the case without the potential regulation members 8. The same applies to yellow toner and magenta toner. As a result, as described with reference to FIGS. 11A and 11B, the secondary transfer efficiency of a chromatic color toner image such as a two-color (M+C) solid toner image is obtained with a relatively low strength of the secondary transfer electric field.

Further, as can be understood from the comparison between the case of the present exemplary embodiment illustrated in FIG. 12 and the case of the first exemplary embodiment illustrated in FIG. 9B, in the present exemplary embodiment, the charge amount of the cyan toner on the intermediate transfer belt 6 after passing through the primary transfer portion N1*k* for black increases, and the difference between the charge amounts of the cyan toner and the black toner on the intermediate transfer belt 6 is small in comparison to the case where the same potential regulation bias (−3000 V) is applied to the potential regulation members 8*y*, 8*m*, and 8*c* for yellow, magenta, and cyan, respectively. In this way, in the present exemplary embodiment, the differences between the charge amounts of yellow, magenta, cyan, and black on the intermediate transfer belt 6 become small. As a result, in the present exemplary embodiment, an excellent secondary transfer efficiency is obtained more stably by adjusting the charge amounts of toner primarily transferred to the intermediate transfer belt 6 on the upstream side and toner primarily transferred to the intermediate transfer belt 6 on the downstream side to be more uniform.

9-3. Effects Under High-Humidity Environment

A description will be given of the effects of the settings of the potential regulation biases according to the present exemplary embodiment under the high-humidity environment.

The charge amount of the black toner on the photosensitive drum 11*k* for black and the charge amount of the black toner on the intermediate transfer belt 6 after passing through the primary transfer portion N1*k* for black (before reaching the secondary transfer portion N2) under the high-humidity environment in the present exemplary embodiment are as illustrated in FIG. 10.

As illustrated in FIG. 10, under the high-humidity environment, the charge amount of the black toner on the photosensitive drum 11*k* for black is smaller than under the low-humidity environment (FIG. 9A). Thus, in the present exemplary embodiment, the potential regulation bias to be applied to the potential regulation member 8*k* for black under the high-humidity environment is decreased in comparison to the potential regulation bias applied to the potential regulation member 8*k* for black under the low-humidity environment. In the present exemplary embodiment, under the high-humidity environment, the potential regulation power supply 80*k* for black is turned off or a potential regulation bias of approximately 0 V is applied to the potential regulation member 8*k* for black. This prevents an excessive decrease in the charge amount of the black toner on the intermediate transfer belt 6 after passing through the primary transfer portion N1*k* for black under the high-humidity environment. As a result, under the high-humidity environment, a decrease in the secondary transfer efficiency of the black toner image is prevented.

In the present exemplary embodiment, the differences in the charge amounts of the yellow, magenta, and cyan toner on the photosensitive drums 11 are sufficiently small between the low-humidity environment and the high-humidity environment. Thus, in the present exemplary embodiment, as illustrated in table 3, the potential regulation biases to be applied to the potential regulation members 8*y*, 8*m*, and 8*c* for yellow, magenta, and cyan, respectively, are set to the same between the low-humidity environment and the high-humidity environment. The present disclosure, however, is not limited to this. For a reason similar to that described regarding the black toner, the potential regulation biases to be applied to the potential regulation members 8*y*, 8*m*, and 8*c* for yellow, magenta, and cyan, respectively, may be differentiated between the low-humidity environment and the high-humidity environment. Table 4 illustrates examples of the settings of the potential regulation biases in a case where the charge amounts of the yellow, magenta, cyan, and black toner on the photosensitive drums 11 decrease under the low-humidity environment in comparison to the high-humidity environment. Similarly, according to the differences in the charge amounts of the toner on the photosensitive drums 11 between the low-humidity environment and the high-humidity environment, at least one of the potential regulation biases to be applied to the potential regulation members 8*y*, 8*m*, 8*c*, and 8*k* for yellow, magenta, cyan, and black, respectively, can be differentiated between the low-humidity environment and the high-humidity environment. Here, under each environment, the potential regulation bias to be applied to a potential regulation member is decreased with its downstream side position among the potential regulation members 8*y*, 8*m*, 8*c*, and 8*k* of the image forming units 10.

TABLE 4

| | Y | M | C | K |
|---|---|---|---|---|
| Low humidity | −3000 V | −2500 V | −2000 V | −1500 V |
| High humidity | −2500 V | −2000 V | −1500 V | OFF (0 V) |

10. Effects

In the present exemplary embodiment, a third photosensitive member (e.g., a third photosensitive member 11*m*) is disposed upstream of the first photosensitive member (e.g., the first photosensitive member 11*c*) in the moving direction of the intermediate transfer belt 6, and the control section 3 controls application sections (a potential regulation power supply) 80*m*, 80*c*, and 80*k* in such a manner that in a case where image formation to form an image on the recording material S by transferring images formed on the first, second, and third photosensitive members (e.g., the third photosensitive member 11*m*, the first photosensitive member 11*c*, and the second photosensitive member 11*k*) to the recording material S is performed, the absolute value of the bias to be applied to the second electrode member (potential regulation member) 8*k* is set to be smaller than the absolute value of the bias to be applied to the first electrode member (potential regulation member) 8*c*, and the absolute value of the bias to be applied to the first electrode member (potential regulation member) 8*c* is set to be smaller than an absolute value of a bias to be applied to a third electrode member (potential regulation member) 8*m*.

As described above, according to the present exemplary embodiment, the secondary transfer efficiency of a multi-color toner image of chromatic colors in which the amounts of toner are great, such as a two-color solid (M+C) toner image, is obtained with a relatively low strength of the secondary transfer electric field, and at the same time a decrease in the secondary transfer efficiency of a toner image in which the amount of toner is small, such as a cyan monochromatic toner image or a black monochromatic toner image is prevented.

A description will be given of a third exemplary embodiment of the present disclosure. The basic configuration and operation of an image forming apparatus according to the present exemplary embodiment are similar to those of the image forming apparatus according to the first exemplary embodiment. Thus, in the image forming apparatus according to the present exemplary embodiment, a component having a function or configuration similar or corresponding to that of the image forming apparatus according to the first exemplary embodiment is designated by the same sign as that in the first exemplary embodiment, and the redundant detailed description is omitted.

Figure 13A:
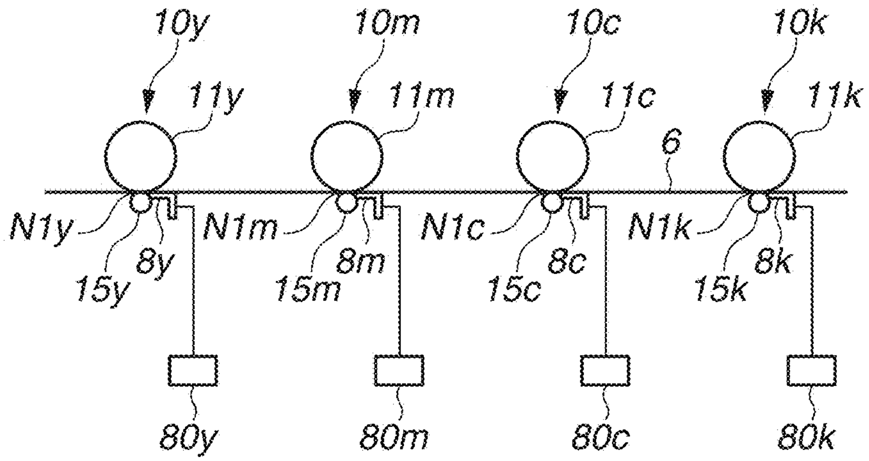
FIGS. 13A to 13C are schematic diagrams illustrating examples of configurations of potential regulation power supplies.
Figure 13B:
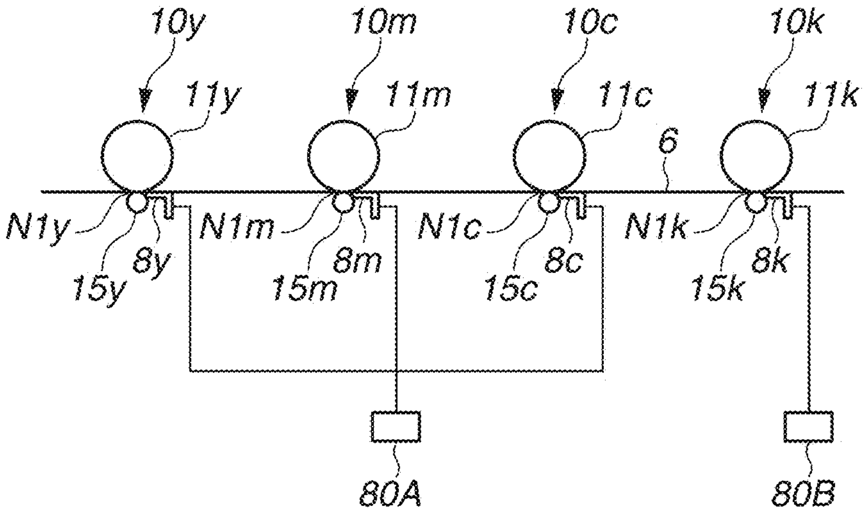
Figure 13C:
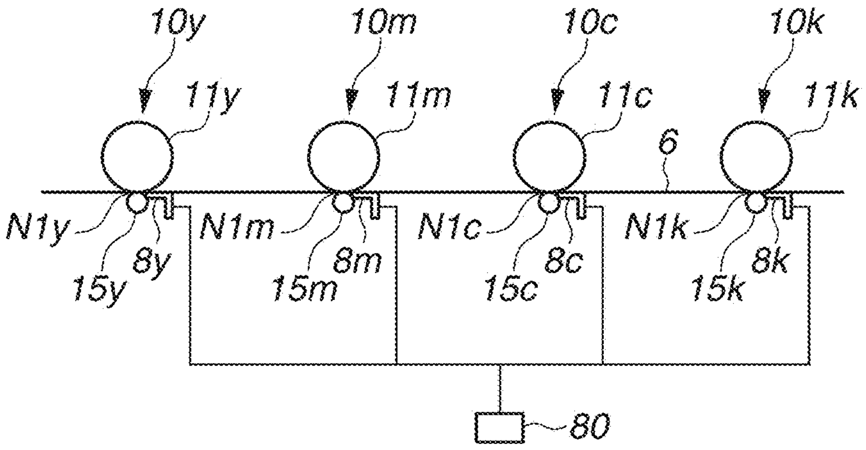

FIGS. 13A to 13C are schematic diagrams illustrating examples of the configurations of power supplies that apply potential regulation biases to the potential regulation members 8*y*, 8*m*, 8*c*, and 8*k* for yellow, magenta, cyan, and black, respectively. In the first and second exemplary embodiments, as illustrated in FIG. 13A, the potential regulation power supplies 80*y*, 80*m*, 80*c*, and 80*k* are independently disposed for the potential regulation members 8*y*, 8*m*, 8*c*, and 8*k* for yellow, magenta, cyan, and black, respectively.

The present disclosure, however, is not limited to such a configuration. A power supply for at least some of the potential regulation members 8*y*, 8*m*, 8*c*, and 8*k* for yellow, magenta, cyan, and black, respectively, may be disposed in common. The power supply is disposed in common, whereby the configuration of the apparatus is simplified and downsized.

For example, as illustrated in FIG. 13B, the image forming apparatus 1 may have a configuration in which a first potential regulation power supply 80A that applies potential regulation biases to the potential regulation members 8*y*, 8*m*, and 8*c* for yellow, magenta, and cyan, respectively, and a second potential regulation power supply 80B that applies a potential regulation bias to the potential regulation member 8*k* for black are disposed. In this case, the potential regulation biases can be set similarly to the first exemplary embodiment by controlling the first potential regulation power supply 80A and the second potential regulation power supply 80B. The first potential regulation power supply 80A and the second potential regulation power supply 80B are controlled, and a variable resistor that is appropriately disposed is also controlled, whereby the potential regulation biases to be applied to the potential regulation members 8*y*, 8*m*, and 8*c* for yellow, magenta, and cyan, respectively, are variably controlled, and the potential regulation biases is set similarly to the second exemplary embodiment.

For example, as illustrated in FIG. 13C, the image forming apparatus 1 may have a configuration in which a common potential regulation power supply 80 that applies potential regulation biases to the potential regulation members 8*y*, 8*m*, 8*c*, and 8*k* for yellow, magenta, cyan, and black, respectively, is disposed. In this case, the potential regulation power supply 80 is controlled, and a variable resistor that is appropriately disposed is also controlled, whereby the potential regulation biases to be applied to the potential regulation members 8*y*, 8*m*, 8*c*, and 8*k* for yellow, magenta, cyan, and black, respectively, are variably controlled, and the potential regulation biases are set similarly to the first and second exemplary embodiments.

A fourth exemplary embodiment of the present disclosure is described. The basic configuration and operation of an image forming apparatus according to the present exemplary embodiment are similar to those of the image forming apparatus according to the first exemplary embodiment. Thus, in the image forming apparatus according to the present exemplary embodiment, a component having a function or configuration similar or corresponding to that of the image forming apparatus according to the first exemplary embodiment is designated by the same sign as that in the first exemplary embodiment, and the redundant detailed description is omitted.

As described in the first exemplary embodiment, the reasons of a decrease in the secondary transfer efficiency of a black toner image in a case with the potential regulation members 8 is due to the position of the image forming unit 10*k* for black and the differences between the components of black toner and toner of colors other than black. In the first and second exemplary embodiments, the image forming unit 10*k* for black is disposed in a furthest downstream position, and the potential regulation biases in the first and second exemplary embodiments are set, whereby a decrease in the secondary transfer efficiency of a black toner image due to the above-described two reasons is prevented. The present disclosure, however, is not limited to such a configuration, and can also be applied to a case where the image forming unit 10*k* for black is not disposed in a furthest downstream position.

For example, transparent toner or white toner can be used in addition to yellow, magenta, cyan, and black toner for the purpose of improving the glossiness or the smoothness of an image. Then, there is a case where an image forming unit 10 for a color (including transparent) other than black may be disposed downstream of the image forming unit 10*k* for black. At least one of the image forming units 10*y*, 10*m*, and 10*c* for yellow, magenta, and cyan, respectively, may be disposed downstream of the image forming unit 10*k* for black.

Figure 14:
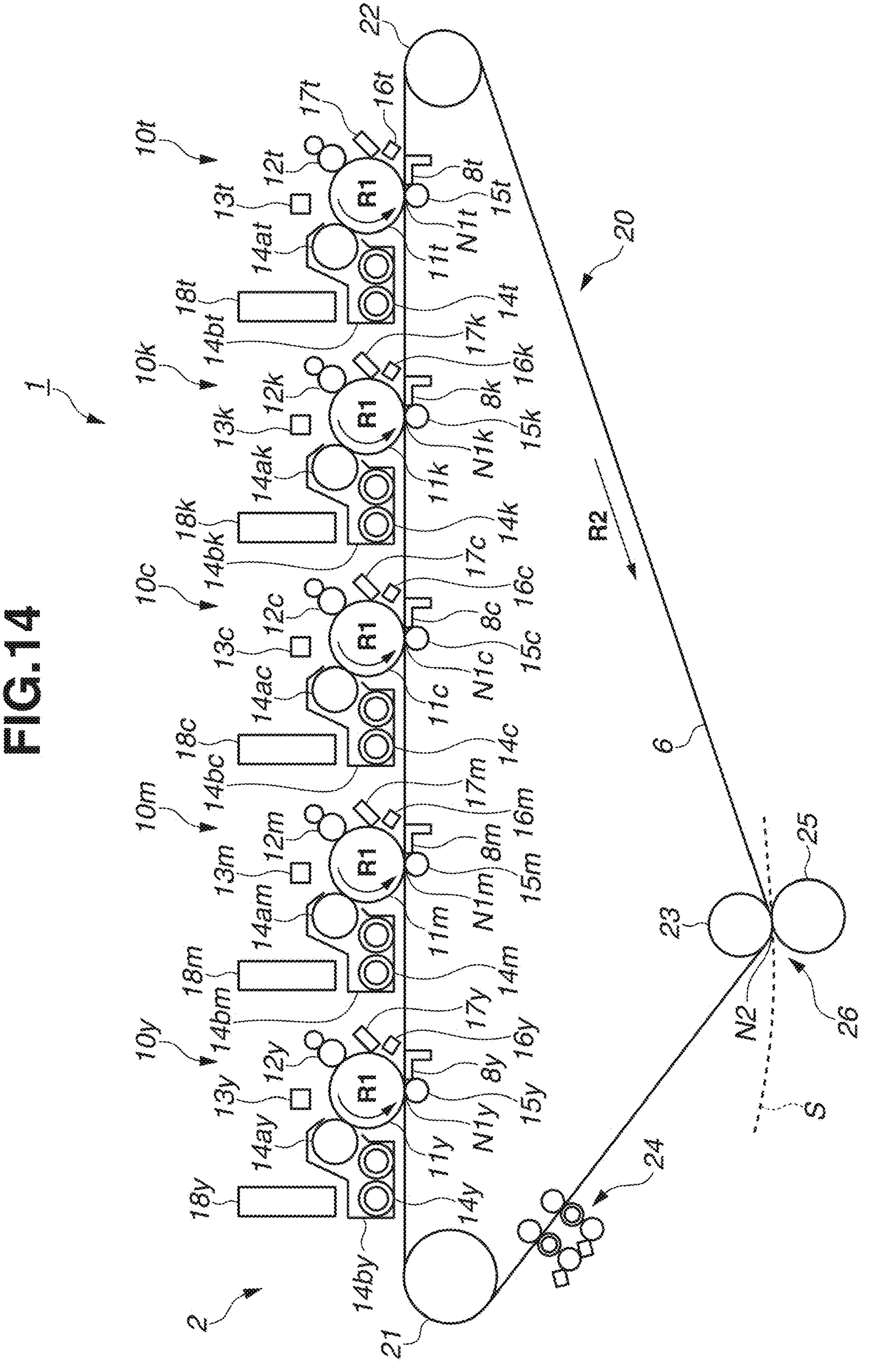
FIG. 14 is a schematic cross-sectional view of another example of the image forming apparatus.

FIG. 14 is a schematic cross-sectional view illustrating the configuration of a part of the image forming apparatus 1 in this case. In the configuration illustrated in FIG. 14, an image forming unit 10*t* that uses transparent toner or white toner is disposed downstream of the image forming unit 10*k* for black (furthest downstream). The character "t" at the ends of signs in FIG. 14 indicates that the components are disposed for transparent or white printing.

Also in this case, similarly to the first exemplary embodiment, the potential regulation bias to be applied to the potential regulation member 8*k* for black can be set smaller than the potential regulation biases to be applied to the potential regulation members 8*y*, 8*m*, 8*c*, and 8*t* for the colors other than black, such as yellow, magenta, cyan, and transparent, respectively.

With this configuration, the charge amount of black toner on the intermediate transfer belt 6 is prevented from being smaller than the charge amounts of toner of the colors other than black, which is particularly due to the differences between the components (mainly the differences between the contents of carbon black) of the black toner and the toner of the colors other than black.

With this configuration, a decrease in the secondary transfer efficiency of a black toner image is prevented.

As described above, in the present exemplary embodiment, a first photosensitive member (e.g., a first photosensitive member 11*k*) is disposed upstream of a second photosensitive member (e.g., a second photosensitive member 11*t*) in the moving direction of the intermediate transfer belt 6, a toner image is formed using black toner on the first photosensitive member 11*k*, a toner image is formed using toner of a color other than black on the second photosensitive member 11*t*, and the control section 3 controls application sections (potential regulation power supplies) in such a manner that in a case where image formation to form an image on the recording material S by transferring the toner images formed on the first photosensitive member 11*k* and the second photosensitive member 11*t* to the recording material S is performed, an absolute value of a bias to be applied to a first electrode member (potential regulation member) 8*k* is set to be smaller than an absolute value of a bias to be applied to a second electrode member (potential regulation member) 8*t*.

In the configuration of the present exemplary embodiment, similarly to the above exemplary embodiments, the potential regulation bias to be applied to the potential regulation member 8*k* for black and also the potential regulation biases to be applied to the potential regulation members 8 for the colors other than black are variable according to the environment.

A fifth exemplary embodiment of the present disclosure is described. The basic configuration and operation of an image forming apparatus according to the present exemplary embodiment are similar to those of the image forming apparatus according to the first exemplary embodiment. Thus, in the image forming apparatus according to the present exemplary embodiment, a component having a function or configuration similar or corresponding to that of the image forming apparatus according to the first exemplary embodiment is designated by the same sign as that in the first exemplary embodiment, and the redundant detailed description is omitted.

In the above exemplary embodiments, the potential regulation member 8*k* is disposed for the image forming unit 10*k* for black as the image forming unit 10 on the downstream side. Then, the potential regulation bias to be applied to the potential regulation member 8*k* is decreased to prevent a decrease in the secondary transfer efficiency of a black toner image as a toner image primarily transferred to the intermediate transfer belt 6 on the downstream side. Alternatively, a configuration in which, depending on the properties of the toner primarily transferred to the intermediate transfer belt 6 on the downstream side or the black toner, a potential regulation member 8 is not disposed for an image forming unit 10 that uses the toner may be employed.

Figure 15A:
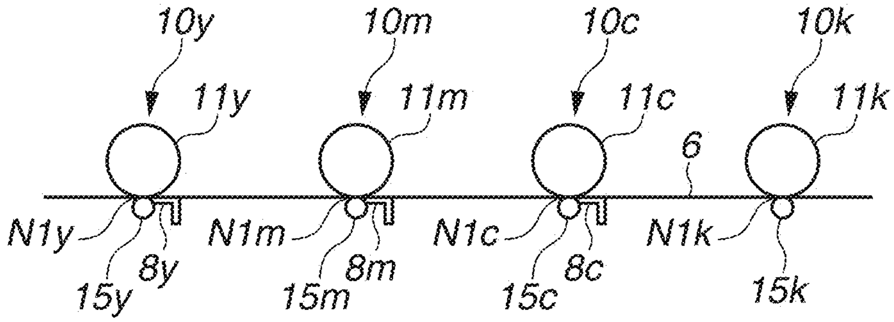
FIGS. 15A and 15B are schematic diagrams of yet another example of the image forming apparatus.
Figure 15B:
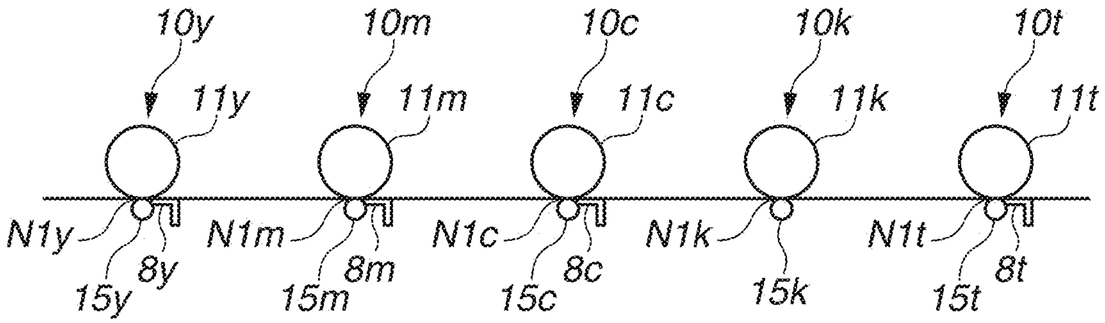

FIG. 15A is a schematic cross-sectional view illustrating the configuration of a part of the image forming apparatus 1 in which a potential regulation member 8 is not disposed for the image forming unit 10*k* for black disposed in the furthest downstream position as the image forming unit 10 on the downstream side. FIG. 15B is a schematic cross-sectional view illustrating the configuration of a part of the image forming apparatus 1 in which a potential regulation member 8 is not disposed for the image forming unit 10*k* for black disposed not in the furthest downstream position as described in the fourth exemplary embodiment.

Also with such a configuration, using mechanisms similar to those according to the above exemplary embodiments, a decrease in the secondary transfer efficiency of a toner image formed by an image forming unit 10 in which a potential regulation member 8 is not disposed is prevented.

In the configuration of the present exemplary embodiment, similarly to the above exemplary embodiments, the potential regulation biases to be applied to the potential regulation members 8 is also variable according to the environment. In the configuration of the present exemplary embodiment, similarly to the second exemplary embodiment, the potential regulation bias to be applied to the potential regulation member 8 of the image forming unit 10 disposed on the downstream side is set to be smaller than the potential regulation bias to be applied to the potential regulation member 8 of the image forming unit 10 disposed on the upstream side.

Others

While the specific exemplary embodiments of the present disclosure have been described, the present disclosure is not limited to the above exemplary embodiments.

While the predetermined charge polarity of the photosensitive member is the negative polarity in the above exemplary embodiments, the present disclosure is not limited to this. The predetermined charge polarity of the photosensitive member may be a positive polarity. Similarly, while the normal charge polarity of the toner is the negative polarity in the above exemplary embodiments, the normal charge polarity of the toner may be a positive polarity. Various voltages to be applied in a case where the predetermined charge polarity of the photosensitive member and the normal charge polarity of the toner are the positive polarities may be appropriately changed, for example, to polarities opposite to those in the above exemplary embodiments based on the above exemplary embodiments.

While the potential regulation bias is subjected to constant voltage control in the above exemplary embodiments, the potential regulation bias may be subjected to constant current control. Similarly, while each of the primary transfer bias and the secondary transfer bias is subjected to constant voltage control in the above exemplary embodiments, at least one of the primary transfer bias and the secondary transfer bias may be subjected to constant current control. The term "constant current control" refers to control for adjustment of the output of the power supply so that a current to be supplied to the supply target is approximately constant at a target current. The term "constant voltage control" refers to control for adjustment of the output of the power supply so that a voltage to be applied to the application target is approximately constant at a target voltage.

While the environment is classified in accordance with the temperature and the humidity (the relative humidity) and used for control in the above exemplary embodiments, the present disclosure is not limited to this. For example, the environment may be classified in accordance with the temperature and the absolute amount of moisture (the absolute humidity) based on the humidity and used for control. While the charge amount of toner has sensitivity to the humidity (or the amount of moisture) in the configurations of the above exemplary embodiments, the environment can be classified in accordance with at least one of the temperature and the humidity and used for control depending on the configuration of the image forming apparatus or the properties of the toner. While the environment is classified into two types in the above exemplary embodiments, the environment may be classified more finely (into three or more types). For example, in a case where the potential regulation biases are changed as illustrated in table 2 or 4, the potential regulation bias to be applied to each potential regulation member can be changed in such a manner that the potential regulation bias to be applied to a potential regulation member is decreased with an increase in the humidity of the environment. A potential regulation bias corresponding to an environment between environments set in the table data may be obtained by interpolation (e.g., linear interpolation). The potential regulation biases are not limited to the settings of the potential regulation biases based on table data, and may be set by a calculation formula representing information indicating the relationship between an environment and a potential regulation bias with respect to each potential regulation member.

The photosensitive member is not limited to a drum-like member (a photosensitive drum), and may be an endless belt-like member (a photosensitive belt).

According to the present disclosure, in a configuration with potential regulation members, excellent secondary transfer properties of both toner primarily transferred to an intermediate transfer belt on the upstream side and toner primarily transferred to the intermediate transfer belt on the downstream side are obtained. While the present disclosure is not limited to this in a configuration with potential regulation members, for example, in a case where toner primarily transferred on the downstream side is black toner, excellent secondary transfer properties of both toner of colors other than black and the black toner are obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-128209, filed Aug. 4, 2023, which is hereby incorporated by reference herein in its entirety.

What is claimed is:

1. An image forming apparatus comprising:

a plurality of photosensitive members;

an intermediate transfer belt capable of a rotation movement and configured to be in contact with the plurality of photosensitive members to form a plurality of primary transfer portions, convey toner images primarily transferred from the plurality of photosensitive members in the plurality of primary transfer portions, respectively, to secondarily transfer the toner images to a recording material in a secondary transfer portion;

a plurality of primary transfer members configured to be in contact with an inner peripheral surface of the intermediate transfer belt and primarily transfer the toner images from the plurality of photosensitive members to the intermediate transfer belt by being applied with a primary transfer bias;

a plurality of electrode members configured to be in contact with the inner peripheral surface of the intermediate transfer belt without forming a nip with the plurality of photosensitive members;

an application section configured to apply a bias with polarity opposite to the primary transfer bias to the at least one electrode member; and a control section configured to control the application section, wherein the plurality of photosensitive members includes a predetermined photosensitive member which is disposed furthest downstream in a moving direction of the intermediate transfer belt, and wherein each of the plurality of electrode members is disposed downstream, in the moving direction of the intermediate belt, of corresponding one of the plurality of primary transfer members corresponding to the plurality of photosensitive members except the predetermined photosensitive member, and is positioned closest to the corresponding photosensitive member among the plurality of photosensitive members.

2. The image forming apparatus according to claim 1, wherein the plurality of photosensitive members except the predetermined photosensitive member each form a color toner image other than a black toner image, and the predetermined photosensitive member forms a black toner image.

3. The image forming apparatus according to claim 1, wherein the application section is a common power supply configured to apply a bias to the plurality of electrode members.

* * * * *